(12) United States Patent
Mrsic-Flogel

(10) Patent No.: US 12,303,793 B1
(45) Date of Patent: May 20, 2025

(54) MULTIPLAYER ONLINE GAME SYSTEM

(71) Applicant: RAPIDFIRE UNICORN LIMITED, London (GB)

(72) Inventor: Janko Mrsic-Flogel, London (GB)

(73) Assignee: RAPIDFIRE UNICORN LIMITED, London (GB)

(*) Notice: Subject to any disclaimer, the term of this patent is extended or adjusted under 35 U.S.C. 154(b) by 0 days.

(21) Appl. No.: 19/033,787

(22) Filed: Jan. 22, 2025

(30) Foreign Application Priority Data

Apr. 23, 2024 (GB) .................................... 2405682
Oct. 29, 2024 (GB) .................................... 2415888
Jan. 9, 2025 (GB) .................................... 2500268

(51) Int. Cl.
*A63F 13/792* (2014.01)
*G06Q 20/12* (2012.01)
*G06Q 20/36* (2012.01)
*G06Q 20/38* (2012.01)
*G06Q 20/40* (2012.01)

(52) U.S. Cl.
CPC ......... *A63F 13/792* (2014.09); *G06Q 20/123* (2013.01); *G06Q 20/367* (2013.01); *G06Q 20/381* (2013.01); *G06Q 20/3825* (2013.01); *G06Q 20/4014* (2013.01); *G06Q 20/4016* (2013.01); *G06Q 2220/00* (2013.01)

(58) Field of Classification Search
CPC .. A63F 13/792; G06Q 20/123; G06Q 20/367; G06Q 20/381; G06Q 20/3825; G06Q 20/4014; G06Q 20/4016; G06Q 2220/00

USPC ............................................................ 463/25
See application file for complete search history.

(56) References Cited

U.S. PATENT DOCUMENTS

| | | | | |
|---|---|---|---|---|
| 2021/0027281 A1* | 1/2021 | Kilroe | .................... | G06Q 40/04 |
| 2021/0118085 A1* | 4/2021 | Bushnell | .................. | H04L 9/50 |
| 2022/0366494 A1* | 11/2022 | Cella | ........................ | H04L 9/50 |
| 2023/0173395 A1* | 6/2023 | Cella | ...................... | G06Q 30/06 463/25 |
| 2023/0214925 A1* | 7/2023 | Cella | ...................... | G06Q 30/06 705/37 |

* cited by examiner

*Primary Examiner* — Pierre E Elisca
(74) *Attorney, Agent, or Firm* — Saul Ewing LLP

(57) ABSTRACT

A computer implemented method for enabling interactions between players participating in a multi-player online game, including: providing the game to each player's computing device; providing a digital wallet that is configured to store and transact game tokens, currency, fiat currency, or cryptocurrency, where the digital wallet is based on a data structure; triggering a direct financial transaction between the players based on the occurrence of a specific game action, where the transaction involves a game token, currency, fiat currency, or cryptocurrency debit to one player and a related or corresponding currency, fiat currency, or cryptocurrency credit to another player that is triggered at substantially the same time as the occurrence of the specific game action; and displaying on each player's computing device the balance or value of their digital wallet at substantially the same time as the occurrence of the specific game action.

30 Claims, 35 Drawing Sheets

| PLAYER'S WALLET PLAY TOKEN BALANCE EQUALS PLAYER'S GAME SCORE | PLAYER'S WALLET PLAY TOKEN BALANCE = 850 | PLAYER'S GAME SCORE = 850 | PLAYER'S GAME SCORE EQUAL TO PLAYER'S PLAY TOKEN BALANCE = 850 |
|---|---|---|---|
| PLAYER'S GAME SCORE IS A MULTIPLE OR DIVISOR OF PLAY PLAYER'S WALLET TOKEN BALANCE | PLAYER'S WALLET PLAY TOKEN BALANCE = 85 | PLAYER'S GAME SCORE = 850 | PLAYER'S GAME SCORE = PLAYER'S PLAY TOKEN BALANCE x 10 |
| PLAYER'S WALLET PLAY TOKEN IS A MULTIPLE OR DIVISOR OF PLAYER'S GAME SCORE | PLAYER'S WALLET PLAY TOKEN BALANCE = 850 | PLAYER'S GAME SCORE = 425 | PLAYER'S GAME SCORE = PLAYER'S PLAY TOKEN BALANCE / 2 |
| PLAYER'S WALLET PLAY TOKEN IS NOT A MULTIPLE OR DIVISOR OF PLAYER'S GAME SCORE, BUT IS RELATED TO PLAYER'S GAME SCORE | PLAYER'S WALLET PLAY TOKEN BALANCE = 850 | PLAYER'S GAME SCORE = 800 | PLAYER'S GAME SCORE = PLAYER'S PLAY TOKEN BALANCE - 50 |

Figure 12

TODAY'S TOP WINNERS

| | | |
|---|---|---|
| 1 | AZTECHNO | $1,397 |
| 2 | HOTSHOT_7905 | $1,340 |
| 3 | PACHACUTTI | $1,108 |
| 4 | 神楽サトシ | $1,039 |
| 5 | YUKI | $1,020 |
| 6 | HOTSHOT_3579 | $929 |
| 7 | ETERNAL4 | $834 |
| 8 | 세종대왕 | $831 |
| 9 | HOTSHOT_4087 | $817 |

LET'S GO!!

HOW IT WORKS

HIT VALUE

RECEIVE HIT VALUE IN COINS FROM THE PLAYER THAT YOU SHOT

EACH PLAYGROUND HAS A SET HIT VALUE FROM $1 UPWARDS $  $$  $$$$$

HIT VALUES RANGE BETWEEN $1 AND $5

GUIDE AND TIPS

Figure 18

HOT SHOT

ALL TIME TOP WINNERS  < >

1. 🏆 HOTSHOT_0017    $127.1K
2. ▥ AZTECHNO         $103.4K
3. ▥ PACHACUTTI       $102.9K
4. ⊘ HOTSHOT_7905     $102,029
5. ◇ JAMJARBRICKS1997 $92,983
6. ▤ MENETHRIL        $82,431
7. ▫ 寿司サトシ         $82,349
8. ▦ GAIA             $74,730
9. ▦ MONOTYPO         $73,012

LET'S GO!!

HOW IT WORKS  < >

KILL EVERYBODY!
SHOOT ALL PLAYERS UNTILL YOU TAKE ALL THEIR MONEY

SKILL AND ACCURACY PAYS DIVIDENDS!

○ ○ ○ ○ ○ ○

GUIDE AND TIPS

| | FROM | | TO | | BALANCE |
|---|---|---|---|---|---|
| ⊕ DEPOSIT<br>3/17/2023, 23:58 | CARD PAYMENT<br>Credit / Debit | $1000.00<br>USD | PLAYER<br>Player Account | $1000.00<br>USD | 1,962.80 TKN<br>PENDING |
| ⊕ DEPOSIT<br>3/17/2023, 23:58 | CARD PAYMENT<br>Credit / Debit | $10.00<br>USD | PLAYER<br>Player Account | $100.00<br>USD | 862.80 TKN<br>SUCCESS |
| ⊕ DEPOSIT<br>3/17/2023, 23:58 | WALLET (ETH)<br>Wallet... 8xx3 🜲 | 0.07 ETH<br>$10.00 USD | PLAYER<br>Player Account | +500.00<br>TKN | 762.80 TKN<br>SUCCESS |
| ⊖ WITHDRAWAL<br>3/17/2023, 23:58 | PLAYER<br>Player Account | -1,000.00<br>TKN | WALLET (TRON)<br>Wallet... 8xx3 🜲 | 10.00 USDT<br>$10.00 USD | 362.80 TKN<br>SUCCESS |
| ⊖ WITHDRAWAL<br>3/17/2023, 23:58 | PLAYER<br>Player Account | -1,000.00<br>TKN | WALLET (ETH)<br>Wallet... 8xx3 🜲 | 10.00 USDT<br>$10.00 USD | 1,262.80 TKN<br>FAILED |
| ⊕ DEPOSIT<br>3/17/2023, 23:58 | CARD PAYMENT<br>Credit / Debit | $100.00<br>USD | PLAYER<br>Player Account | +1000.00<br>TKN | 1,262.80 TKN<br>CANCELLED |
| ⊕ GAME RESULTS<br>3/17/2023, 23:58 | HOTSHOT<br>Game Reference | | PLAYER<br>Player Account | +1,197.20<br>TKN | 1,262.80 TKN |
| ⊕ GAME RESULTS<br>3/17/2023, 23:58 | HOTSHOT<br>Game Reference | | PLAYER<br>Player Account | -34.40<br>TKN | 65.80 TKN |
| ⊕ DEPOSIT<br>3/17/2023, 23:58 | CARD PAYMENT<br>Credit / Debit | $10.00<br>USD | PLAYER<br>Player Account | +100.00<br>TKN | 100.00 TKN<br>SUCCESS |

Figure 30

331
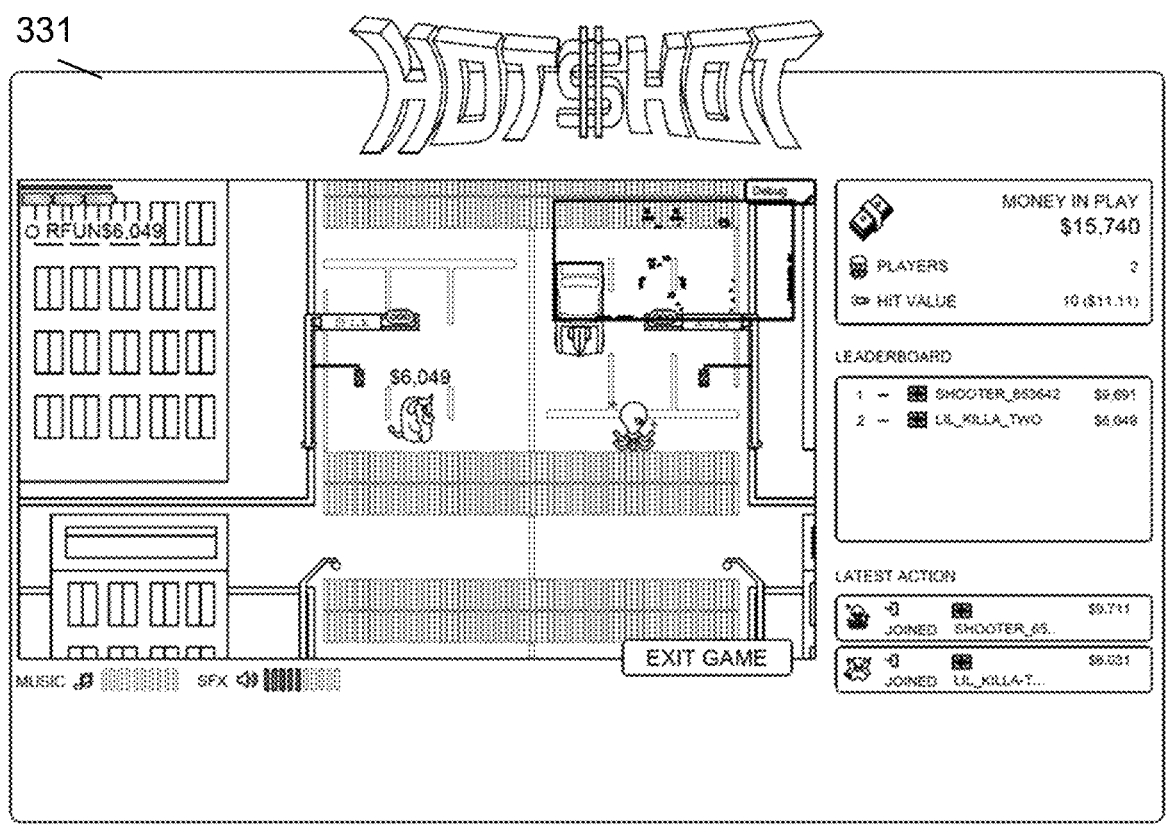
332
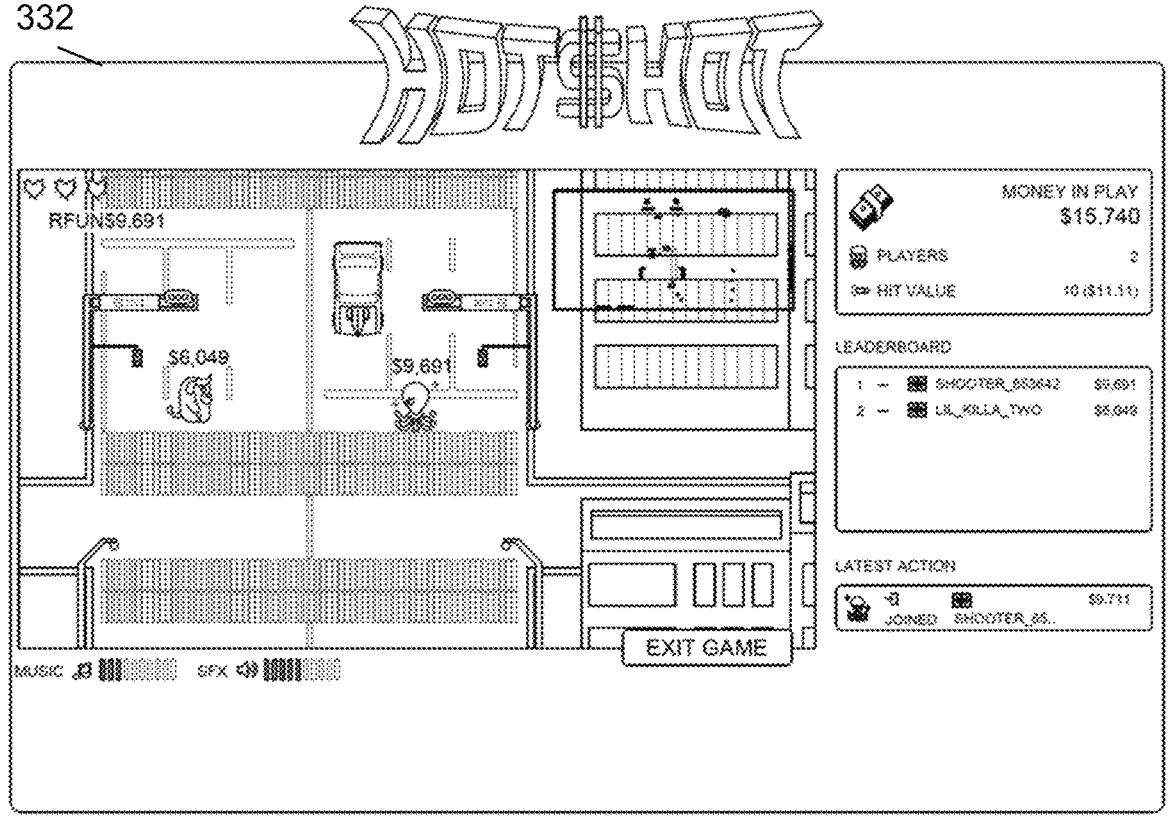
Figure 33

331
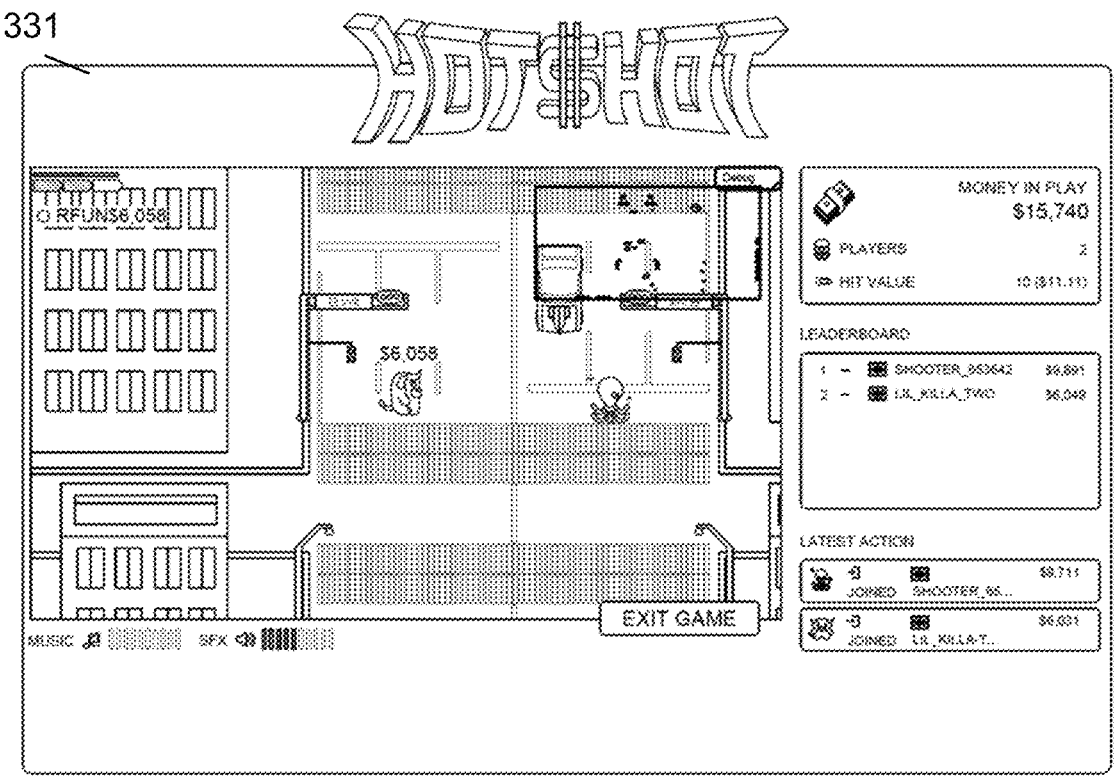
332
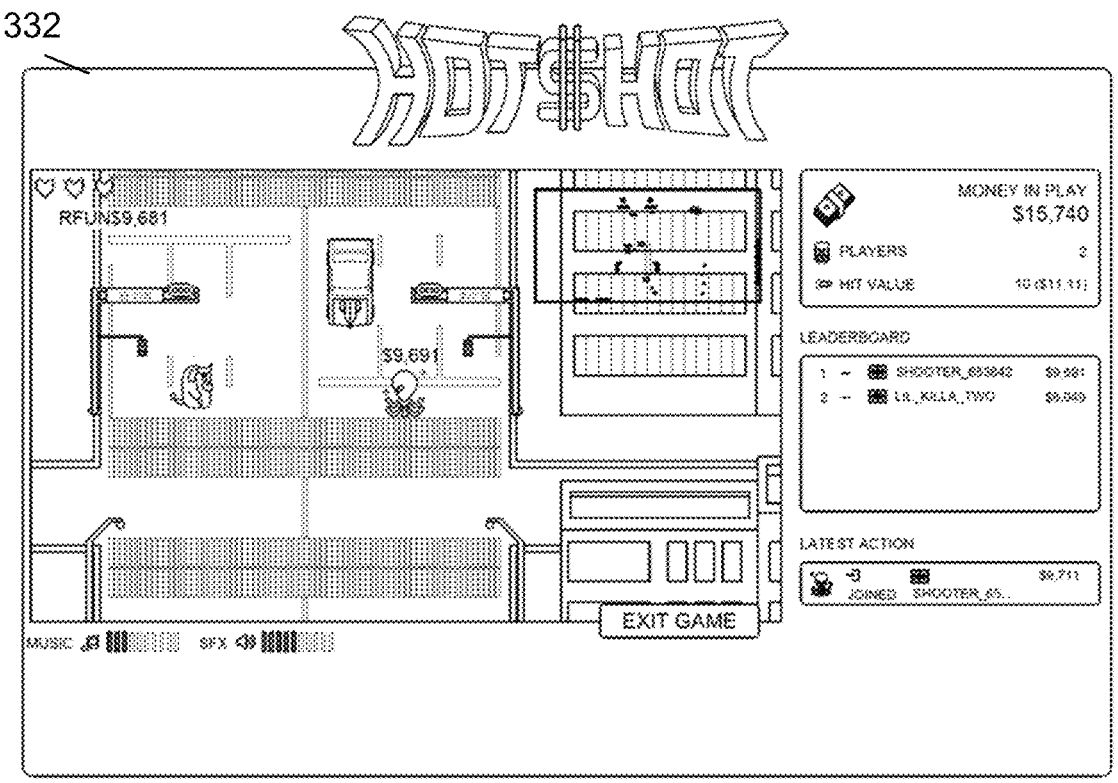
Figure 35

MULTIPLAYER ONLINE GAME SYSTEM

CROSS-REFERENCE TO RELATED APPLICATIONS

This application claims priority to GB Application Nos. GB2405682.2, filed Apr. 23, 2024; GB2415888.3, filed Oct. 29, 2024; and GB2500268.4, filed Jan. 9, 2025, the entire contents of which being fully incorporated herein by reference.

BACKGROUND OF THE INVENTION

1. Field of the Invention

The field of the invention relates to systems or methods for enabling interactions between players of a multiplayer online game.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Multiplayer online gaming has been introduced since mid-1980s and has gained in popularity in 1990s and widespread adoption following the advent of the Internet and the introduction of broadband and mobile connectivity. Multi-player online games are characterised as having more than one player playing from different devices, participating in the same game environment provided by a game server instance.

Players of multiplayer online games use various devices, such as computers, mobile phones, consoles or dedicated electronic devices to connect to the game server over the Internet or other data networks. This connection is typically established through a downloaded application, a pre-installed application, or via a web browser interface. Any such player device will require the devices to have an active internet connectivity to be able to communicate directly with game systems on the Internet. The connection will also require a certain latency and bandwidth for maintaining a quality gaming experience.

While multiplayer games offer dynamic and immersive experiences, existing systems often rely on traditional centralised methods for handling in-game interactions. For example, in-game interactions, such as in-game currency transactions or achievements are typically managed through a central server, where updates occur within the game's internal systems or databases. These interactions may limit direct, real-time exchanges between players and often result in delays or lack of transparency.

There is a need to enhance real-time interaction between players of online game systems and/or to optimise fast transaction processes in gaming environment.

SUMMARY OF THE INVENTION

An aspect of the invention is a computer implemented method for enabling interactions between players participating in a multi-player online game, the method comprising the steps of:

(a) providing or making available the multi-player online game to each player's computing device;

(b) providing or making available to the players a digital wallet that is configured to store and transact game tokens, currency, fiat currency or cryptocurrency, where the digital wallet is based on a ledger, blockchain, distributed ledger, centralised ledger or any other data structure;

(c) triggering a direct financial transaction between the players participating in the online game based on the occurrence of a specific game action, where the direct financial transaction involves a game token, currency, fiat currency or cryptocurrency debit to one player and a related or corresponding game token, currency, fiat currency or cryptocurrency credit to another player that is triggered at substantially the same time as the occurrence of specific game action;

(d) displaying on each player's computing device the balance or value of their digital wallet at substantially the same time as the occurrence of the specific game action.

Another aspect of the invention is a computer implemented system for enabling interactions between players participating in a multi-player online game, the system comprising:

(a) a game server configured to provide or make available the multi-player online game to each player's computing device;

(b) a digital wallet that is configured to store and transact game tokens, currency, fiat currency, or cryptocurrency, where the digital wallet is based on a ledger, blockchain, distributed ledger, centralised ledger or any other data structure;

(c) a transaction module subsystem configured to trigger a direct financial transaction between the players participating in the online game based on the occurrence of a specific game action, where the direct financial transaction involves a game token, currency, or fiat currency, or cryptocurrency debit to one player and a related or corresponding game token, currency, or fiat currency, or cryptocurrency credit to another player that is triggered at substantially the same time as the specific game action and where the transaction module subsystem is also configured to cause the game server to display on each player's computing device the balance or value of the digital wallet at substantially the same time as the occurrence of the specific game action.

Advantageously, the method and system described ensure that game tokens or currency credits or debits occur almost simultaneously with a triggering in-game event or action. This enhances real-time interaction between players and provides an immediate reflection of changes in the players' digital wallets. The load on central servers is also reduced as transactions occur directly between players' digital wallets. Transaction latency is also reduced. Players can experience immediate feedback, making the gaming experience more dynamic and immersive.

BRIEF DESCRIPTION OF THE FIGURES

Aspects of an implementation of the invention will now be described, by way of example(s), with reference to the following Figures, which each show features of an implementation the invention:

FIG. 12 shows examples of the relationship between a game player's wallet token balance and the player's in-game score, with the corresponding game score and token balance displayed for each scenario or condition.

FIG. 18 shows a HOTSHOT game client interface.
FIG. 19 shows a HOTSHOT game client interface.
FIG. 24 shows a HOTSHOT game client interface.
FIG. 30 shows a HOTSHOT game client interface.

FIG. 33 shows screenshots from the computer device display of both player A and player B, showing their respective balances or game scores prior to the initiation of a game action.

FIG. 35 shows screenshots from the computer device display of both player A and player B, showing their respective balances or game scores being altered at substantially the same time as the event of player B being hit by player A.

DETAILED DESCRIPTION

Figure 1:
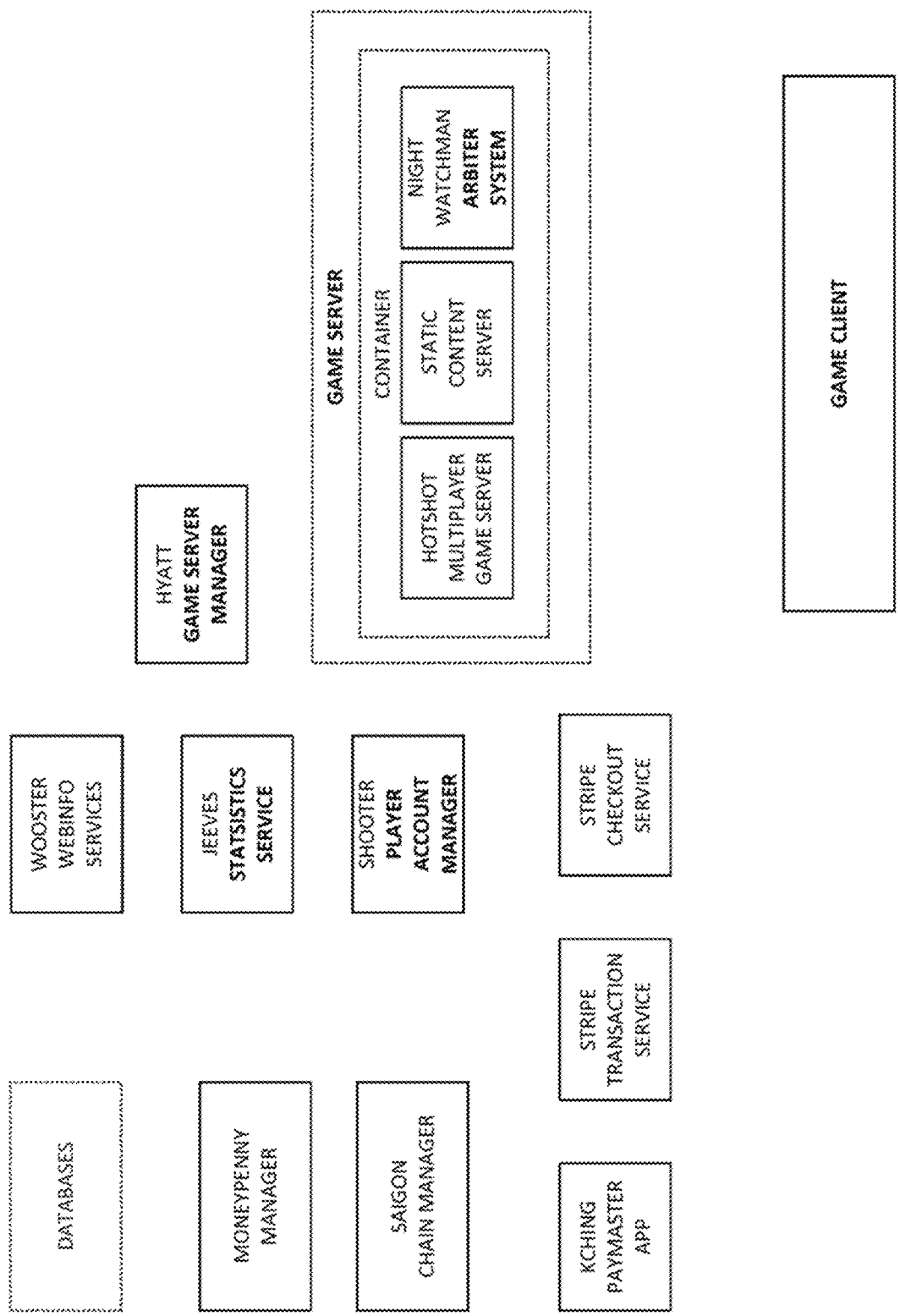
FIG. 1 shows a game system architecture of a gaming platform.

This Detailed Description section describes several implementations of the invention. These implementations include multiplayer online gaming systems and methods that incorporate a digital wallet allowing real-time direct, low-latency adjustment of the token balances of players during gameplay. A digital wallet, which may be based on blockchain or other ledger technology, is linked to each player's account. The system triggers or facilitates immediate player token balances adjustments or player to player transactions based on specific in-game actions, such as one player's bullet "hitting" another player in a shooting game. The wallet balance of each player is updated in real-time and displayed to both players simultaneously.

Key features of the implementation are, but not limited to:
real-time token balances adjustments or player to player transactions: in-game actions (like a hit in a shooting game) are directly linked with simultaneous wallet updates between multiple players. The transaction module debits one player's wallet and credits the other, with minimal latency.

use of digital wallets (including cryptocurrency wallets) in online games: in-game events trigger changes in the digital wallet.

token transfers triggered by game events: blockchain-based tokens or game tokens are transferred automatically based on in-game events such as hits in a shooting game.

transactions are recorded on a blockchain or a similar ledger system, ensuring security and immutability.

real-time updates to a player's digital wallet during gameplay, triggered by in-game actions and involving direct player-to-player transfers. The digital wallet's balance is displayed on the player's screen at the time of the event, ensuring transparency and real-time updates.

combination of digital wallets and blockchain transactions in games with automatic real-time wallet updates based on game interactions.

The multiplayer online gaming system further adheres to regulatory frameworks. Depending on the jurisdiction in which the game is played, the transaction module framework may be designed to prohibit the platform from acting as a custodian of funds or an exchange. The system is therefore also able to adapt to cryptocurrency regulations in different regions.

The following methods, systems and devices can be applied across a variety of interactive gaming environments such as shooting games, tank games, spacecraft games, puzzle games, board games, car racing/bumping games or sport games involving multiple players such as boxing or martial arts games.

A wide range of board games and board configurations is supported, from chess or checkers to role-playing, trivia-based games, and any new designed board games, with customisable features for each. Individual game pieces may be assigned specific transactional or game token value reflective of their significance within the game. For example, in chess, a pawn could be valued at USD 1, while a queen might hold USD 50, thereby translating a game action into direct financial transactions between players. When a piece is captured, its game token value may then be directly transferred from the digital wallet of the losing player to the digital wallet of the player that has captured the piece. Game piece (capturer, captured) tuples may also be assigned a specific transactional or game token value reflective of their significance within the game. For example, in chess, if a queen captures a pawn, the pawn value could be USD 1, while if a pawn captures a pawn the captured pawn's value might be USD 5.

In particular, the systems and devices may be applied to skill-based games wherein the game outcome depends on player's abilities, strategies, and decision-making, rather than only chance.

Advantages of the implementations include, but are not limited to:
- real-time feedback: gaming experience is enhanced by offering immediate wallet updates in response to in-game actions, creating a dynamic and engaging environment.
- blockchain security: utilizing blockchain ensures secure, transparent transactions, reducing the risk of fraud and ensuring accountability in financial exchanges.
- customizability: players can tailor the transaction triggers and display options to their preferences, adding an element of personalization to the gameplay.
- Fast transaction gaming: allowing player to player in-game financial transactions that have low latency and enhance real-time game play.
- economic flexibility: both fiat currency and cryptocurrencies are supported, offering players and game developers greater flexibility in how transactions are handled.
- transparent leaderboards: players can see rankings based on real-time wallet balances, offering a clear and competitive measure of success.
- fraud prevention: cryptographic measures and transaction logging are used, protecting against hacking or game client tampering.
- ecosystem expansion: by allowing withdrawals, token lending, and external wallet integration, this system bridges the gap between the game and the broader cryptocurrency ecosystem.

For illustrative purposes, we reference the HOTSHOT game implementation of the invention, which is a shooting game where players can fire bullets at other players in same area map and in the same game room. However, the techniques are not limited to such scenarios and can be applied to a wide range of multiplayer or single-player games, with interaction within a common or dynamically generated environment. The methods and systems provide flexibility for various game designs and interaction models.

In the HOTSHOT game example, players move around the map using cursor keys or specified keys for up, down, left and right movement actions. Other keys provide further functionalities. As an example, a fire key can fire bullets at other players. As another example, a "leave" key, when pressed, requests for the player to leave the game. As another example, a key mapping module enable the customisation of a set of keys.

The system provides a game server that offers access to the multiplayer game on each player's device. Each player is equipped with a digital wallet capable of storing currency or cryptocurrency, and the system features a transaction module that handles financial transfers.

FIG. 1 provides a game system architecture of a gaming platform including components such as databases, service managers, transaction services, a central game server, a game client and other services. The central game server may include various modules for multiplayer gaming, content server and arbitration.

Game Rooms and the Game Room Manager

In the HOTSHOT game, multiple players are playing in the same game room, featuring the same area map in which the players can interact. The game can instantiate multiple game rooms each catering for a specific maximum player capacity. Such game rooms are instantiated on a game server system and are organized by the game server manager system. The game servers can be geographically located close to the players, to provide quicker speeds and shorter Ethernet communication latency between the players device and Internet-based game system. Geographic demand-based instantiation of the game servers may also be performed by the game server manager.

Game Sign-In and Player Authentication

The player initially connects to the 'Player Account Manager' to authenticate the player's identity. The 'Player Account Manager' system will generate a play token account on the game's internal ledger system for every validated player. The account is validated using a validated email address or a blockchain-based wallet application, such as MetaMask or Coinbase.

Authenticating the player's play token account using a validated email address also automatically generates a blockchain wallet address that is associated with the player's email address and that can be used in the future for token funds transfer.

Figure 2:
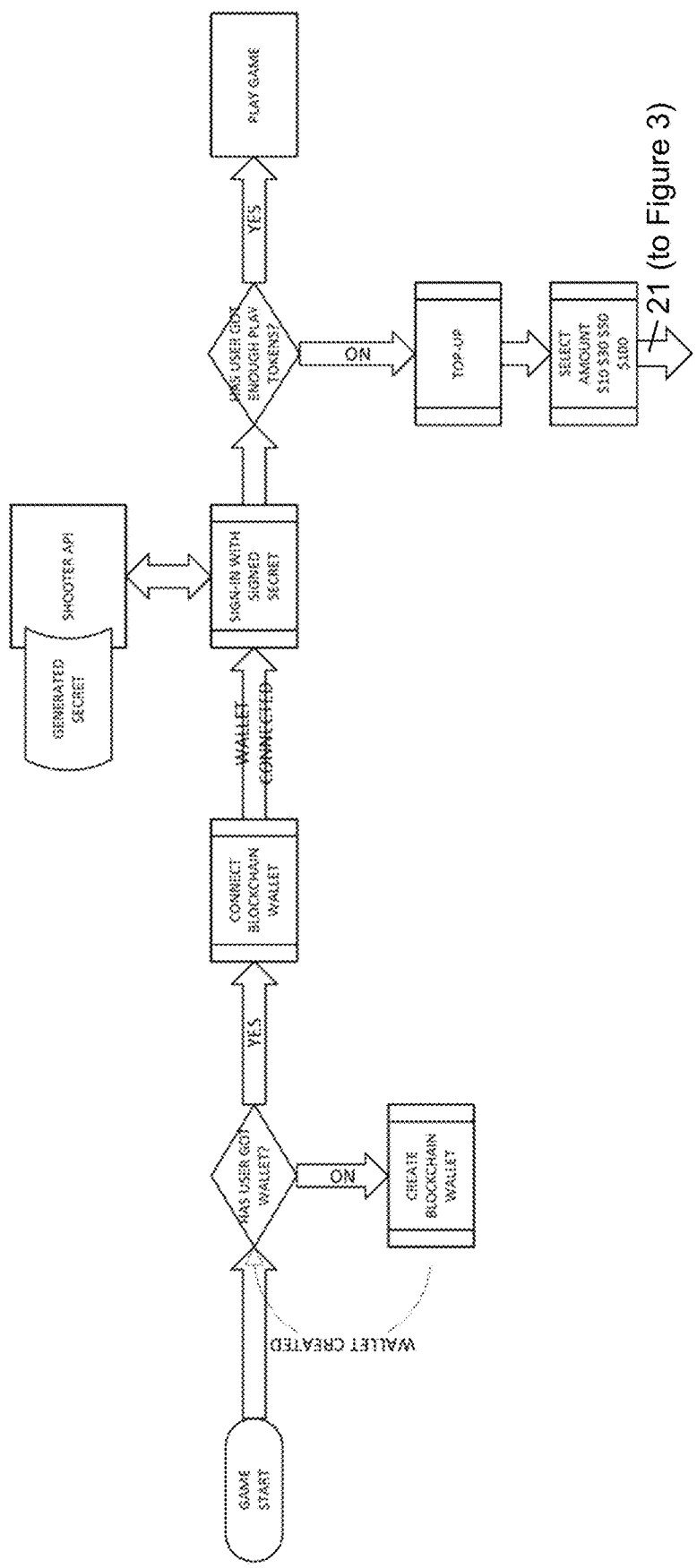
FIG. 2 shows a flowchart for starting a game with blockchain wallet integration.
Figure 3:
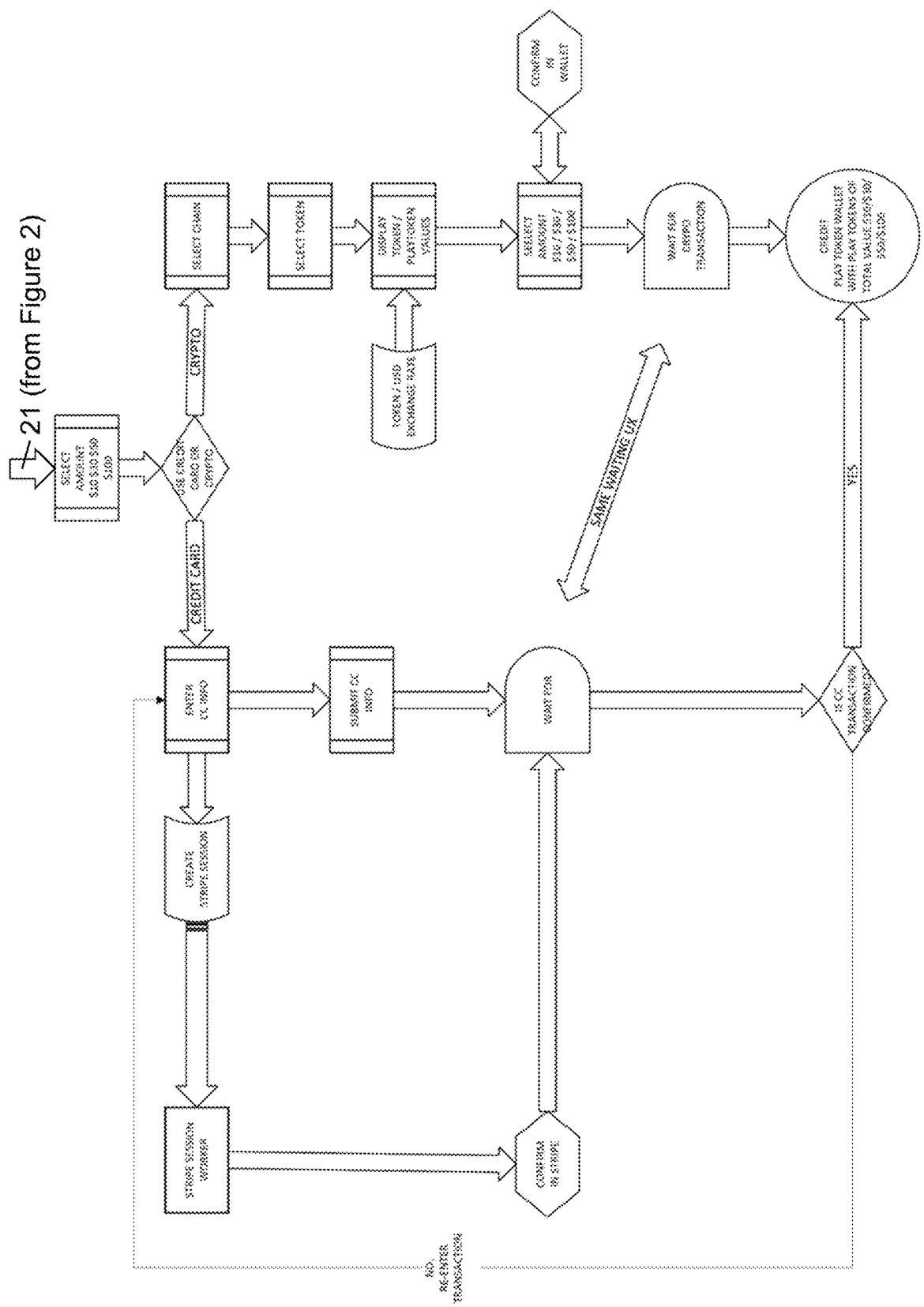
FIG. 3 shows a flowchart for topping up play tokens.

FIGS. 2 and 3 together illustrate a flowchart for starting a game with blockchain wallet integration, which may include one or more of the following steps: checking wallet existence, creating or connecting a wallet, signing in with a secret, and verifying sufficient play tokens before allowing a game to start. A top-up option is also available if the user doesn't have enough play tokens. As shown in FIG. 3, the top-up options for selecting an amount include paying with a credit card or cryptocurrency and confirming the payment. The process involves steps like creating a payment session, submitting payment details, waiting for transaction confirmation, and crediting tokens to a wallet once completed.

Game Play Token Purchase and Account Top-Up

Once authenticated, the player can purchase play tokens. The play tokens hold a fixed value that is linked to a fiat currency. The value of the play token in the HOTSHOT game is linked to a currency value, such as US Dollar. Once play tokens are successfully purchased by the users, they are credited to the player's play token account and are included in player's account balance. Appropriate exchange rate and transaction fees are also applied to the token purchase. The exchange rate and transaction fees are set by the game operator.

The player's play token account can be topped up at any time, by the player successfully purchasing additional play tokens.

A minimum token balance may be required on the player's play token account to enter the game.

Play tokens can be purchased using a variety of payment methods, including credit card, debit card, digital payment platforms like PayPal and blockchain-based crypto currencies and tokens. Supported cryptocurrencies may include Ethereum, stablecoins like Tether or USD Coin and as well as other tokens or cryptocurrencies accepted by the game operator.

Player Accounts

In the HOTSHOT game, every player has a play token account. The player token account is identified by a unique address in the overall play token ledger. This player account ledger and account address can be part of a public or private blockchain system or can be stored in alternative ledger storage mechanisms such as databases or other stored digital data files.

Figure 4:
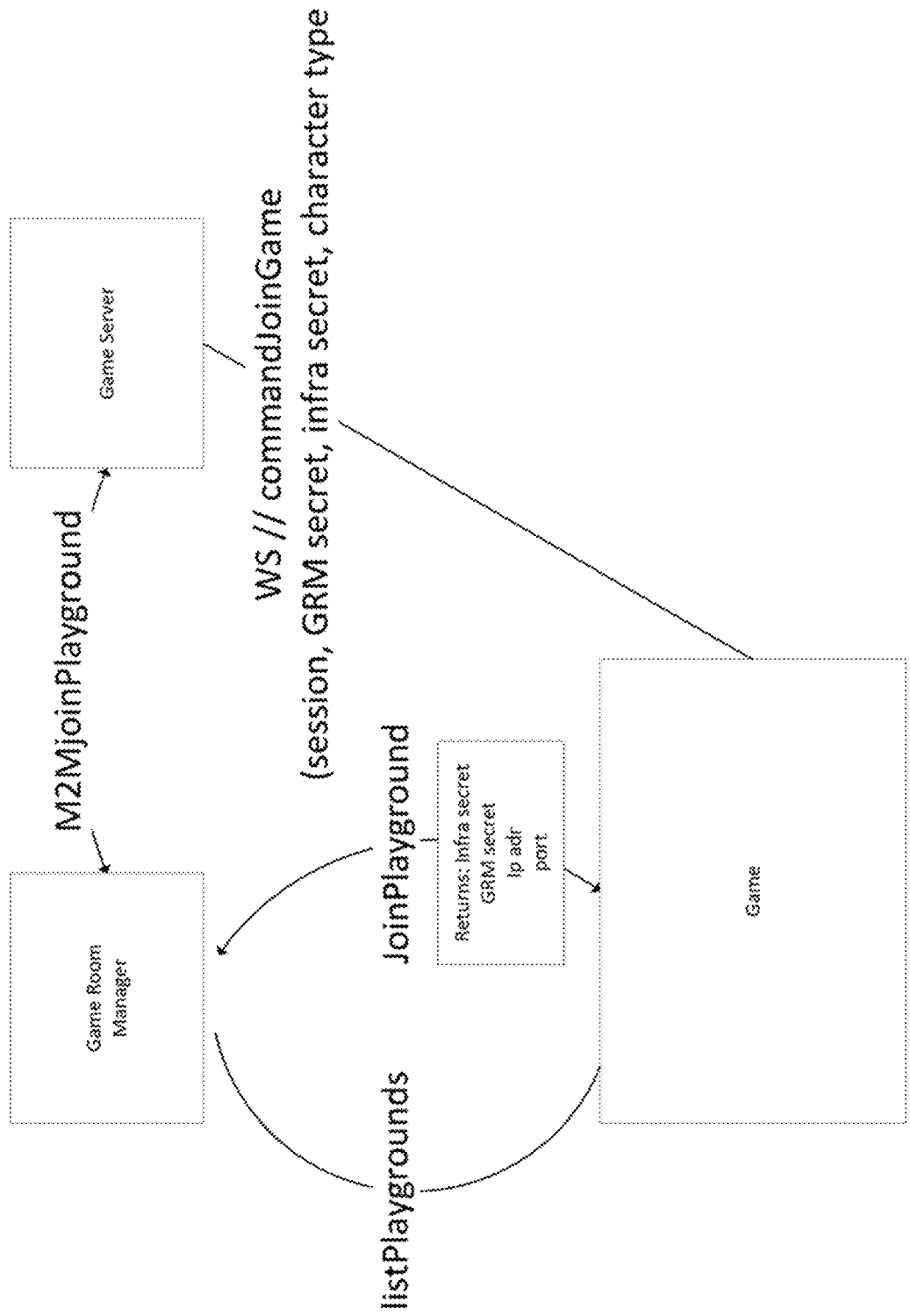
FIG. 4 shows a flowchart of player's game client joining an online game on the game server via the game room manager.

FIG. 4 illustrates a flowchart of player's game client joining an online game on the game server via the game room manager.

Figure 5:
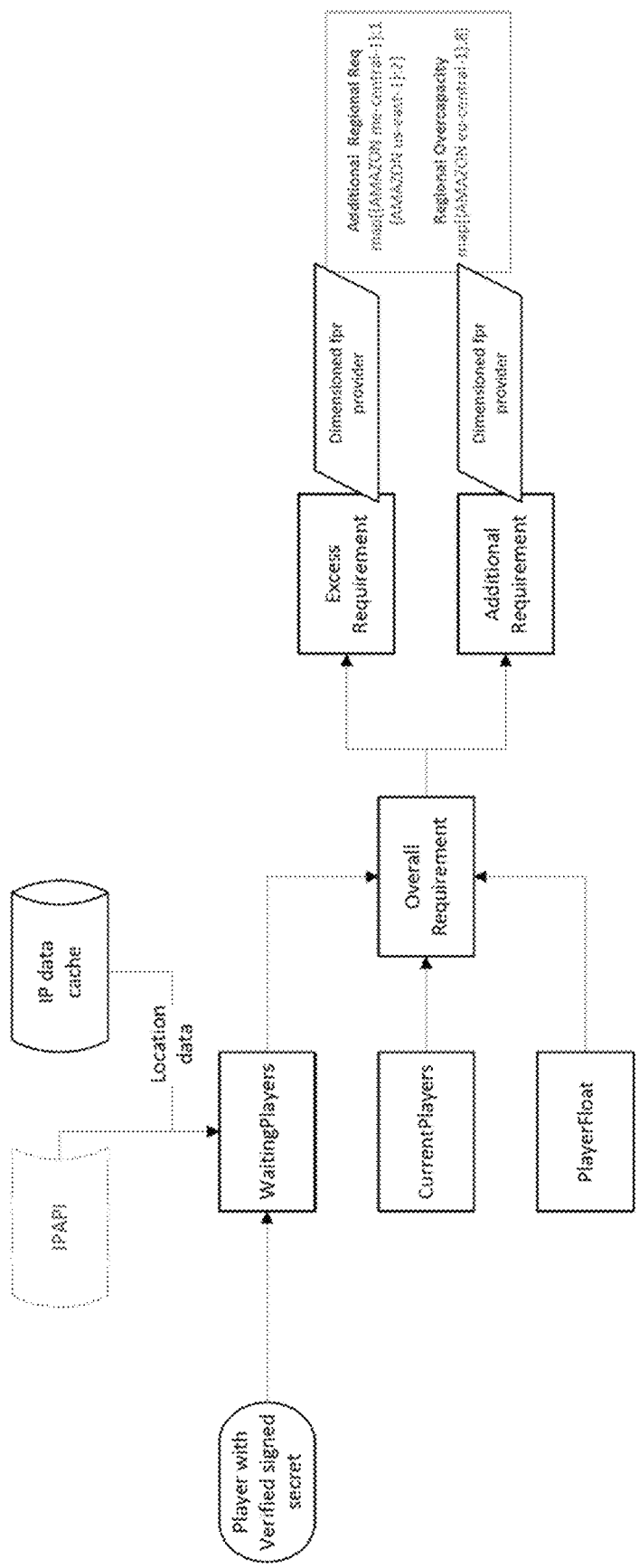
FIG. 5 shows a diagram illustrating a game server capacity planning.

FIG. 5 is a diagram illustrating a game server capacity planning. Player requirements may be determined based on location data and/or player activity. The game server capacity planning may include for example the steps of verifying players, tracking current and/or waiting players and/or any other variability in player demand, calculating overall requirements, and determining additional and/or excess needs. Regional adjustments may be made based on data provided by service providers.

Direct Play-Related Player to Player Transactions Related to Gameplay

In the HOTSHOT game and other planned games, we are introducing a direct relationship between the score displayed for a player in the game and their play token account balance on their player token account.

For example, if the player's token balance on their player token account is 1000 units, the score displayed in the game is 1000. The relationship between the player's token balance and the player in-game score could be a multiple or a divisor of the token balance. For example, if the player's token balance on their player token account is 1,000 units, the score displayed in the game is 5,000 (using a multiple of 5). In this case we multiply the player's token balance (1,000 tokens) by 5 and get 5,000. The relationship between the balance and the score may alternatively be determined by a mathematical formula that includes the player's account token balance, for example (SCORE=TOKEN BALANCE−1). In this case, if the player's token balance on player token account is 1000 tokens, the score displayed in the game would be 999.

We are further introducing the concept of direct financial transactions between two players based on player game actions and consequential game events that are directly related to the said player game action.

Here is an example of such a player, game action, consequential game event and the ensuing direct transaction: a player game action is, for example, a bullet being fired by player A towards player B. Player A presses a key to invoke the firing of a bullet towards player B. The consequential game event to this player game action is when the bullet fired by player A hits player B. Such a hit creates a direct financial transaction between player A and Player B, transferring tokens from player B's account to player A's account. The amount and value of tokens debited from Player B's account is the same as the amount and value of tokens credited to player A's account, save any transaction fees.

For example, if the value of a player hit is 10 play tokens, 10 play tokens will be deducted from player B's play token balance and added to player A's play token balance, save any transaction fees. The balance of Player B prior to transfer is 100 Tokens. The balance of Player B prior to transfer is 50 tokens. Transaction fee is 1 Token and, in this case, will be debited from Player A's account. Player B is debited 10 tokens, so the balance post transfer will be 40. Player A's account token balance is credited with 10 tokens, minus the transaction fee of 1 token (100 (existing balance)+ 10 (transfer from Player B)−1 (transaction fee)=109 post transaction.

The transaction fee can mean the gas fee in the case of a blockchain or can mean a single fixed fee or percentage fee (percentage of transaction) or any number of compound fees imposed by the game system operator or both.

The transaction fee may not need to be imposed at all or could be attributed to Player A only or Player B only or could be fractionalized and split between Player A and Player B.

Value Variability of Game Events

The value of a player hit or other game events can vary between Game Server instances. The value of a player hit or other game events is set by the Game Server Manager when instantiating a Game Server. The Game Server Manager can set the transfer value of each collision type between Player A's and Player B's sprite assets in the Game Room provided by the Game Server.

In-Game Leaderboard

The HOTSHOT game has a leaderboard for each online game currently being played where the ranking of the players is solely dependent on their current play token balance. The leader board is listing the players and their token balances in decreasing value of the current token balance, where the ranking of players is dependent on their current play token balance.

In-Game Player Value Display

In the HOTSHOT game the account/wallet balance value of each player is displayed in the game next to or above or to the side or below of each player's sprite on the game area map.

In-Game Notifications

In game notifications are received from the game server, notifying players about events such as other players joining or leaving the game, being eliminated or eliminating another player. Specifically, the notification for a player joining includes a display of the joining player's token account balance. Similarly, notifications for players leaving the game may also display the leaving player's token account balance.

Leaving the Game as a "Good Leaver"

A player can leave the game by submitting a request to leave and remaining in the game for a specific period of time, provided that certain game events, such as being hit by another player, do not occur during this time period. For example, when a player presses the 'Leave' game request key or button, a 20 second timer may start. If a player remains in the game without being shot for the next 20 seconds, then they can exit the game with their player play token account balance intact. However, if the player is hit by an enemy bullet during this time, the timer is suspended and may reset completely back to 20 seconds. The player will have to press the 'Leave' key or button again to repeat request to leave the game.

The player can leave the game with a player's play token balance being higher than the balance they entered the game with. Alternatively, the player can also leave the game with a player's play token balance being lower than the balance they entered the game with.

Leaving Due to Elimination

A player can be eliminated from the game if the player's token balance reaches a minimum value, such as zero (0). For example, this may happen when specific game events occur such as collisions of the player's character with a bullet sprite that was fired by another player.

Timer Mechanism to Remain in the Game

A timer mechanism may be imposed on the player, if the player's play token balance reaches a minimum value, requiring the player to increase their play token balance (by shooting other players) withing a period of time.

Leaving the Game as a "Bad Leaver"

When a player leaves the game due to an Internet connection loss or purposeful disconnection, it is classified a "bad leaver" and a token penalty may be imposed on the player by the game operator. In such cases, the game operator deducts a specific amount of play tokens from the player's play token account upon detecting "bad leaver" situation. The penalty can be a fixed token amount, a percentage of tokens held in the player's play token account or a combination of minimum number of tokens and a percentage of tokens held in the player's play token account. The penalty tokens may be transferred to the game operator's play token account.

Modifying or Hacking the Game Client

If a player's client is modified or hacked and the game arbiter system or game server detect a change in client behaviour by a player's device, the player may be disconnected or penalized by deducting play tokens from the modified client player account. The player account may also be suspended, and the player may be barred from playing again.

Total Value in Play

In the HOTSHOT game, the value of the sum of all players' play token balances that are playing in the game room is displayed in the game as a value in play indicator.

Withdrawal of Tokens

A play token refers to a digital currency unit stored in a player's digital wallet that can be earned, spent, or transferred during gameplay based on specific game actions, where the value of the play token may be tied to a cryptocurrency or fiat currency.

Play tokens can be withdrawn from the player's play token account to a designated blockchain account. Play tokens may be withdrawn, using one or more of the following, but not limited to:

(i) by converting the value of the specified number of player's play tokens to the crypto currency or blockchain token, wallet address and chain which was originally used to purchase tokens at the current exchange rate and subject to current transaction and withdrawal fees for that token exchange, as dictated by the game operator. The game operator will deduct the specified number of play tokens to be withdrawn from the player's play token account and deposit an amount of crypto currency or blockchain token to the player's external blockchain account.

(ii) or by converting the value of the specified number of player's play tokens to preferred blockchain token on a specific blockchain specified by the game operator at the current exchange rate and subject to current transaction and withdrawal fees for that token exchange, as dictated by the game operator. The game operator will deduct the specified number of play tokens to be withdrawn from the player's play token account and deposit an amount of the preferred blockchain token to the player's external blockchain account.

(iii) or by transferring the value of the specified number of player's play tokens on the game ledger to a different blockchain and ledger by the game operator at subject to current transaction and withdrawal fees for that token transfer, as dictated by the game operator. The game operator will deduct the specified number of play tokens to be withdrawn from the player's play token account and transfer the tokens (minus the transfer and withdrawal fees) to the player's external blockchain account.

The play tokens hold a fixed value that is linked to a fiat currency. The value of the play token in the HOTSHOT game is linked to the US dollar.

A minimum token balance on the player's play token account may be required to withdraw tokens from the player's play token balance account.

Game Server Manager

A game server manager manages the game server resources globally on the wide-area network such as the Internet.

The game server manager (GSM) allocates further game server resources based on a successfully signed secret code that was provided by the authentication server to the players device and the player's blockchain wallet on the player's device.

The GSM may set the value of a hit in the game on a specific game server instance: for example 50 play tokens per hit or USD $50 per hit.

The game server manager may also set the value of each collision type between Player A and Player B sprite assets in the game room provided by the game server.

Arbiter System

A device that monitors the multiplayer game play in game room instantiated by the game server. The arbiter system is configured to detect possible cyber security hacks. The arbiter system also validates all inter-player game actions and transactions taking place in the game Player Device The game is played using a network connected computing device, such as a computer (desktop/laptop), PDA, mobile phone, console or any other connected device.

Player BlockChain Wallet

A blockchain wallet application may reside on the Player Device or online on the wide area network such as the Internet PBW (Play By Web) can sign a secret message provided by the Gamer Authentication System.

Player Digital or Token Wallet

A device where a player holds a certain amount of play currency or play tokens.

A digital wallet application, typically based on type blockchain technology, enables players to store, send, and receive digital tokens that represent various assets, including cryptocurrencies, utility tokens, security tokens, non-fungible tokens (NFTs), and more. The digital wallet application interacts with different blockchain networks to manage the user's token balances and facilitate transactions. Additionally, the digital wallet application may also provide additional features, such as displaying the current market value of tokens, integrating with other applications or platforms, and supporting multiple types of tokens.

Game Actions

A game action may refer to any in-game event initiated by a player that can result in financial transactions, including actions such as firing a weapon, completing a mission, or achieving a milestone.

Game actions or events may also be dependent on a user's skill while playing the game.

A token transfer may refer to the movement of a predefined number of digital tokens from one player's wallet to another's, initiated by an in-game action such as a successful hit in a combat-based game.

Examples of game actions are now provided. Game actions may result in a token transfer from one player's token account to another player's token account, where the increase of one player's token account that is directly related to the decrease in another player's token account.

For example:
- where the increase in value of Player A's token account balance is equal to the value decrease of Player B's play token account (and where the increase in value of Player A's game score is equal to the value decrease of Player B's game score). Example: Token transfer of 10 tokens from Player B to Player A. Balance of Player A prior to transfer is 100 Tokens. Balance of Player B prior to transfer is 50 tokens. There is no transfer fee. Player's A balance post transfer is 100+10 tokens=110 Tokens. Player's A balance post transfer is 50-10 tokens=40 Tokens.
- where the increase in value of Player A's token account balance is equal to Player B's play token account balance minus a transfer fee (and where the increase in value of Player A's game score is equal to the value decrease of Player B's game score minus the score value of the transfer fee. Example: Token transfer of 10 tokens from Player B to Player B. Balance of Player A prior to transfer is 100 Tokens. Balance of Player B prior to transfer is 50 tokens. Transfer fee is 1 Token. Player A is credited 10 tokens minus 1 Token transfer fee=+9 tokens. Player's A balance post transfer is 109 Tokens. Player B is debited 10 Tokens=−10 tokens. Player B's balance post transaction is 40.
- where the decrease in value of Player B's token account balance is equal to Player A's play token account balance minus a transfer fee (and where the increase in value of Player A's game score is equal to the value decrease of Player B's game score plus the score value of the transfer fee). Example: Token transfer of 10 tokens from Player B to Player B. Balance of Player A prior to transfer is 100 Tokens. Balance of Player B prior to transfer is 50 tokens. Transfer fee is 1 Token. Player A is credited 10 tokens=+10 tokens. Player's A balance post transfer is 110 Tokens. Player B is debited 10 Tokens minus 1 Token transfer fee=−11 tokens. Player B's balance post transaction is 39.
- where the increase of Player A's play token account balance is equal to the decrease of Player B's play token account balance and a transfer fee is split into two fractions, one fraction attributed player A and the other player B, and their respective play token account balances are decreased by those fractional values. Example: Token transfer of 10 tokens between Player A and Player B. Balance of Player A prior to transfer is 100 Tokens. Balance of Player B prior to transfer is 50 tokens. Transfer fee is 1 Token and is split in two fractions ½ and ½. Player A is credited 10 tokens minus ½ *1 Token transfer fee=+9.5 tokens. Player's A balance post transfer is 109.5 Tokens. Player B is debited 10 Tokens minus ½ *1 Token transfer fee=−10.5 tokens. Player B's balance post transaction is 39.5.

A token transfer from one player's token account to another player's token account, where this transfer may be reflected in both players scores, which are related to the player token account balances or wallet balance.

For example: in a transfer of a number of tokens from Player A's token account/wallet to Player B's digital wallet, the following scenarios of transfer fees may apply:
- a transfer fee in tokens, or a fraction of tokens, is deducted from Player A's digital wallet.
- a transfer fee in tokens, or a fraction of tokens, is deducted from Player B's digital wallet.
- a transfer fee in tokens, or a fraction of tokens, is split into two fractions, one deducted from Player A's token account/wallet, and the other deducted from Player A's t digital wallet.

Blockchain Wallet Application

A blockchain wallet application is a software program that enables users to store, send, and receive digital assets that are secured by blockchain technology. A blockchain wallet application interacts with a blockchain network to generate and manage cryptographic keys, sign and broadcast transactions, and monitor the balance and history of the user's digital assets. A blockchain wallet application may also provide additional features, such as displaying the current market value of the digital assets, integrating with other applications or platforms, and supporting multiple types of digital assets.

Smart contracts may also be used to manage in-game item ownership and transaction conditions automatically, enhancing trust and eliminating intermediaries. Non-fungible tokens (NFTs) may also be employed to represent in-game assets, offering players true ownership of items that can be transferred outside the game environment.

Leaderboard

A leaderboard in an online game currently being played where the ranking of the players is solely dependent on their current play token balances in their respective accounts.

The leader board may be listing the players and their token balances in decreasing value of the current token balance, where the ranking of players is dependent on their current play token balance.

Game Alert Message in a Game Currently being Played

A game alert message is a message to player A (the main player) from a game server.

A game alert message may for example:
- display the token balance of another (enemy) player when this other player joins the game.
- display the token balance of another (enemy) player when this other player leaves the game.
- display the token balance-related score of another (enemy) player when this other player joins the game.
- display the token balance-related score of another (enemy) player when this other player leaves the game.

Game Token Balance Display

The wallet balance of each player may be displayed in the game next to (above/to the side/below of each player.

Each player in the game (game room) has a game score, which is related to the player's play token account or wallet balance, such as the following:
- the player's game score is equal to the player's play token account or wallet balance.
- the player's game score may be a multiple or divisor of the player's wallet balance. For example, the player's game score could be 10 times the wallet balance; if the wallet balance is 5, the score would be 50.
- the player's play digital wallet balance may be a multiple or divisor of the player's game score.
- the player's wallet balance may not be a direct multiple or divisor of the game score, but instead related to it by a simple mathematical relationship, for example, the player's game score could be equal to the player's wallet balance plus or minus a set value.

Examples of game action are now provided as the following, but not limited to:
- a manual action of Player A directed at Player B.
- an in-game sprite asset of Player A is colliding with an in-game sprite asset of Player B such as a bullet/ projectile fired by the in-game character of Player A hitting the in-game character of Player B.

an in-game delegate sprite of Player A is colliding with an in-game sprite asset of Player B. For example a droid belonging to Player A hits the in-game character of Player B.

an in-game delegate sprite of Player A is colliding with an in-game delegate sprite of Player B. For example a droid sprite delegate of Player A hits a droid sprite delegate of Player B a bullet/projectile fired by the in-game spaceship of Player A hitting the in-game spaceship of Player B.

a bullet/missile/projectile fired by the in-game tank of Player A hitting the in-game tank of Player B.

a bullet/projectile sprite fired by the in-game sprite of Player A hitting the in-game sprite of Player B.

involving the in-game sprite of Player A colliding with Player B in a game such as a boxing game.

involving the in-game vehicle sprite of Player A colliding with the vehicle sprite of Player B in a game such as a car racing game.

FIGS. 6 to 35 provides illustrations for enabling interactions between players participating in a multi-player online game.

Figure 6:
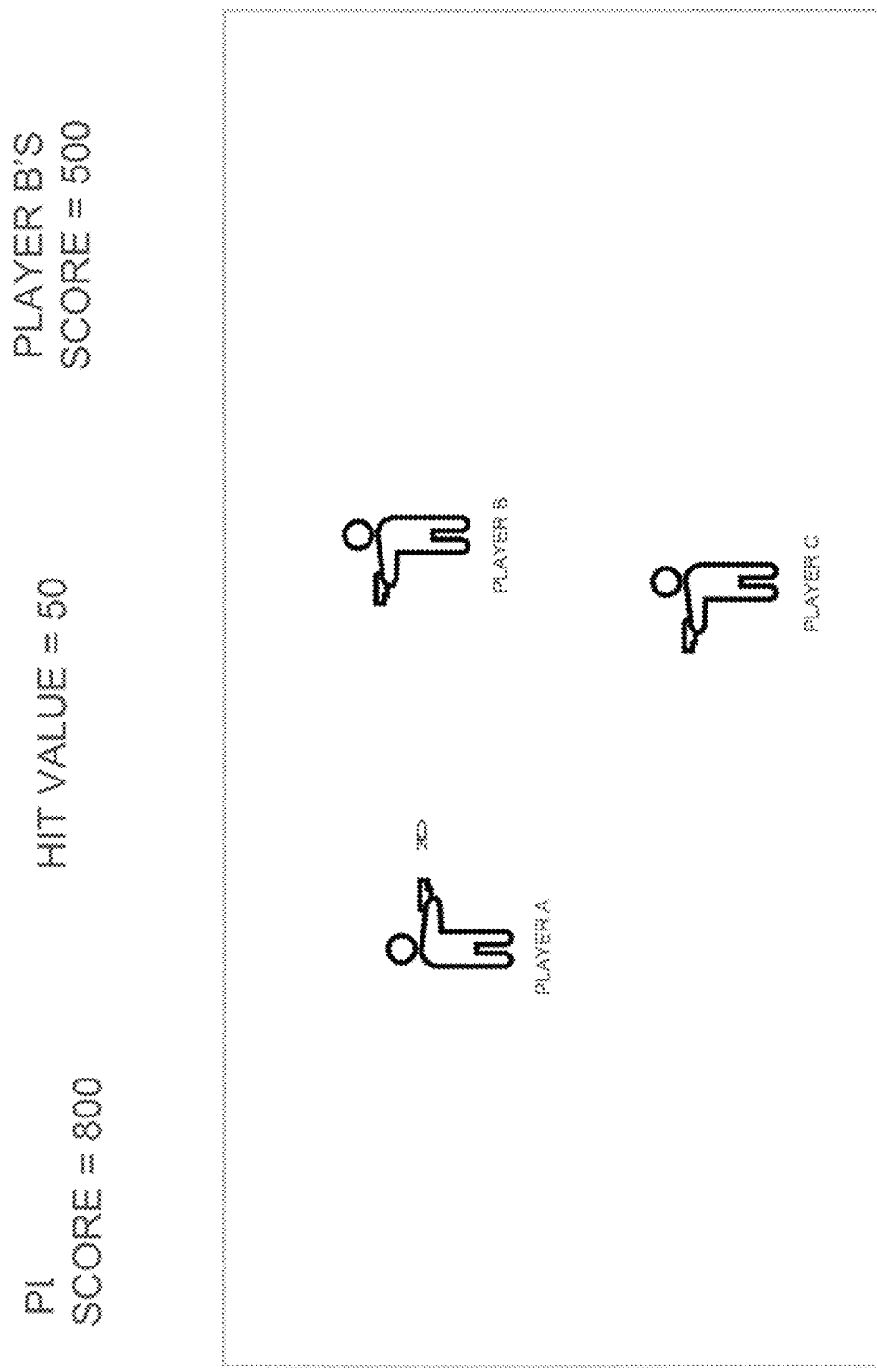
FIG. 6 shows a game scenario displaying the scores of Player A and Player B scores and hit value.
Figure 7:
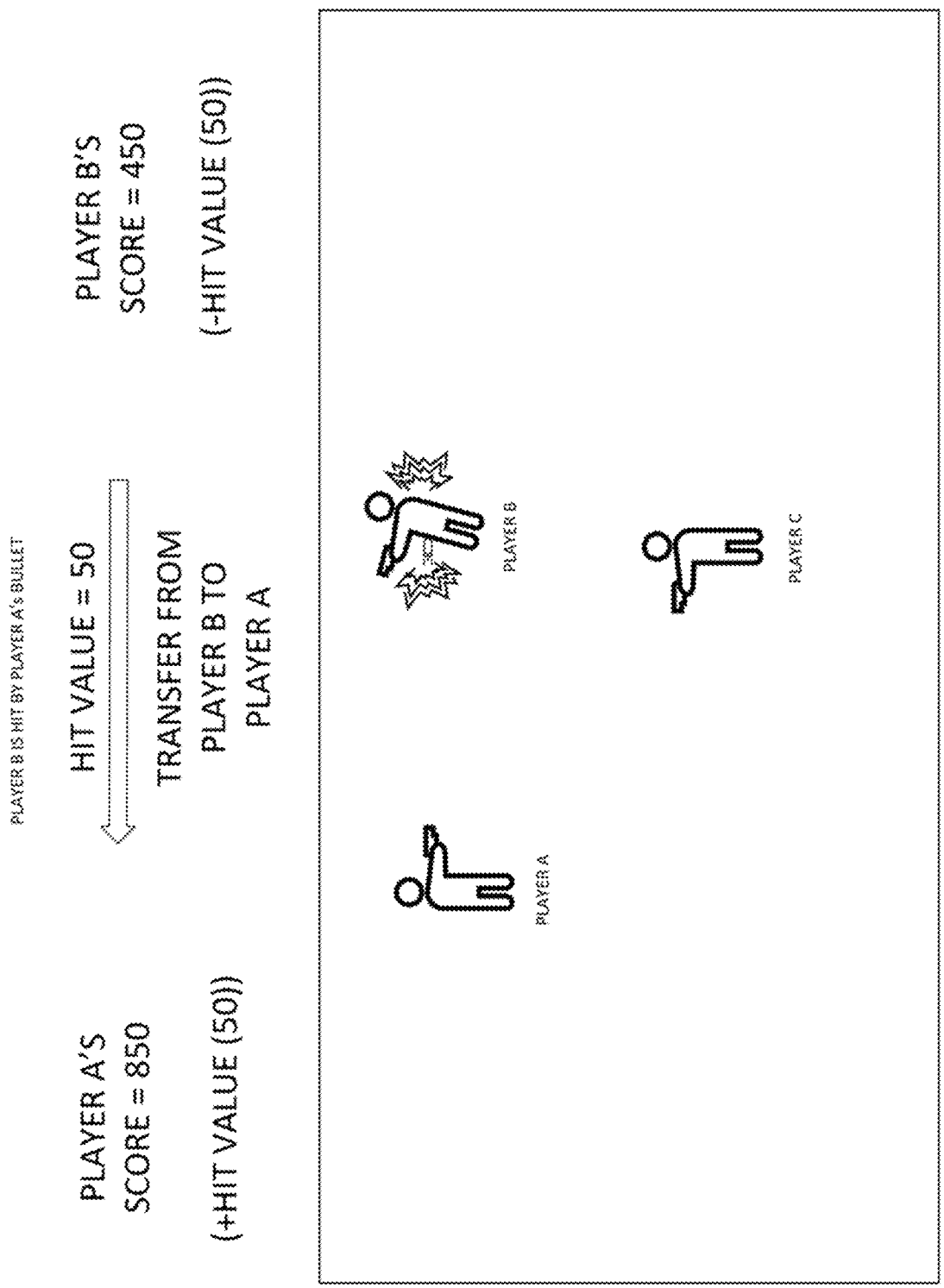
FIG. 7 shows a game scenario involving a bullet hit event, where a transfer of hit value occurs from Player B's play token account to Player A's play token account.

FIG. 6 illustrates a game scenario displaying the scores of Player A and Player B scores and hit value. FIG. 7 illustrates a game scenario involving a bullet hit event, where a transfer of hit value occurs from Player B's play token account to Player A's play token account.

Figure 8:
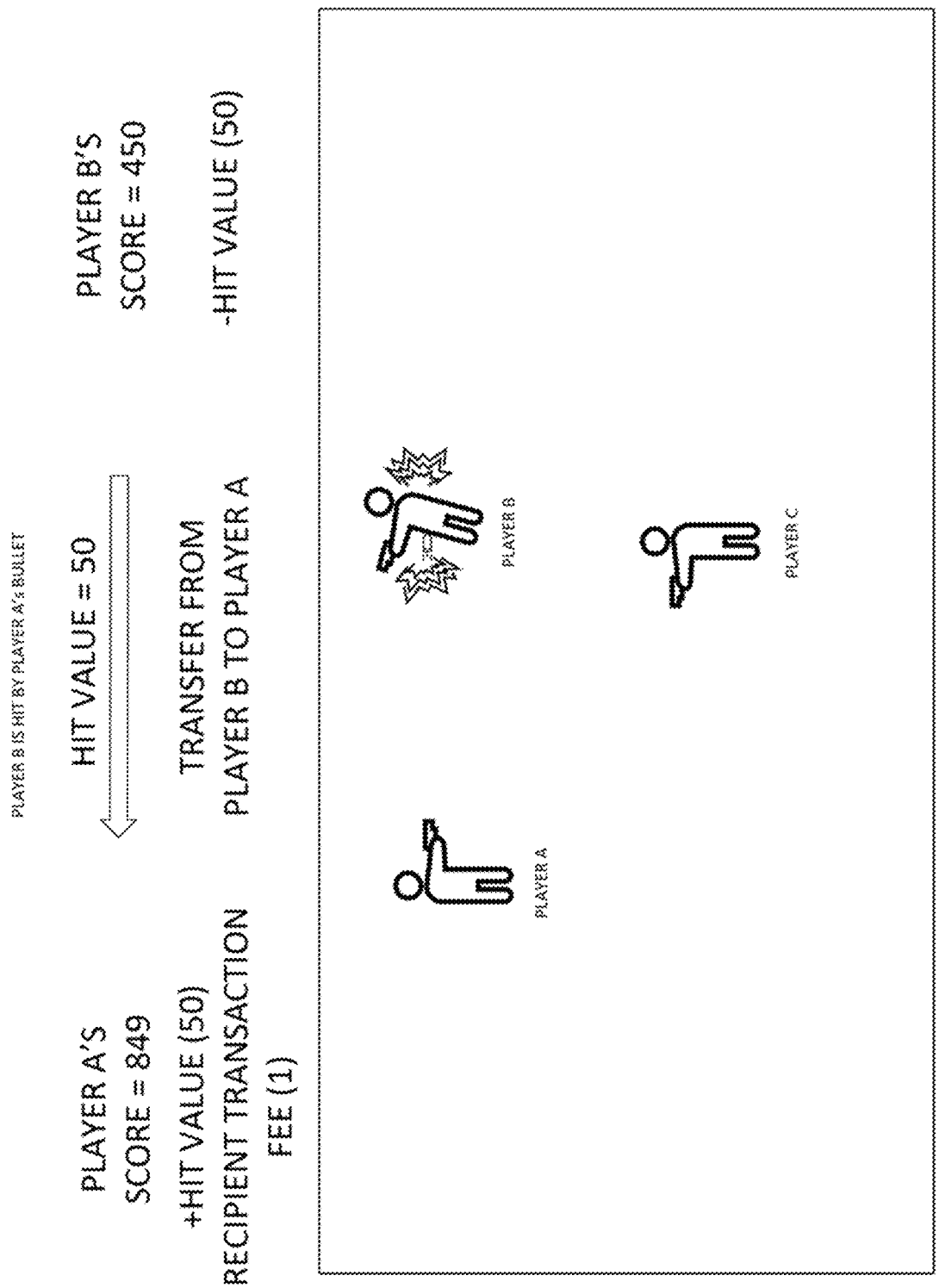
FIG. 8 shows a game scenario involving a bullet hit event, where a transfer of hit value from Player B's play token account to Player A's play token account.

A hit event may refer to a game action where one player's in-game character successfully strikes another player's character, triggering both an in-game consequence and a direct financial transaction where tokens are transferred from the hit player's digital wallet to the wallet of the attacking player FIG. 8 illustrates a game scenario involving a bullet hit event, where a transfer of hit value from Player B's play token account to Player A's play token account, where the token recipient is debited the full transaction fee.

Figure 9:
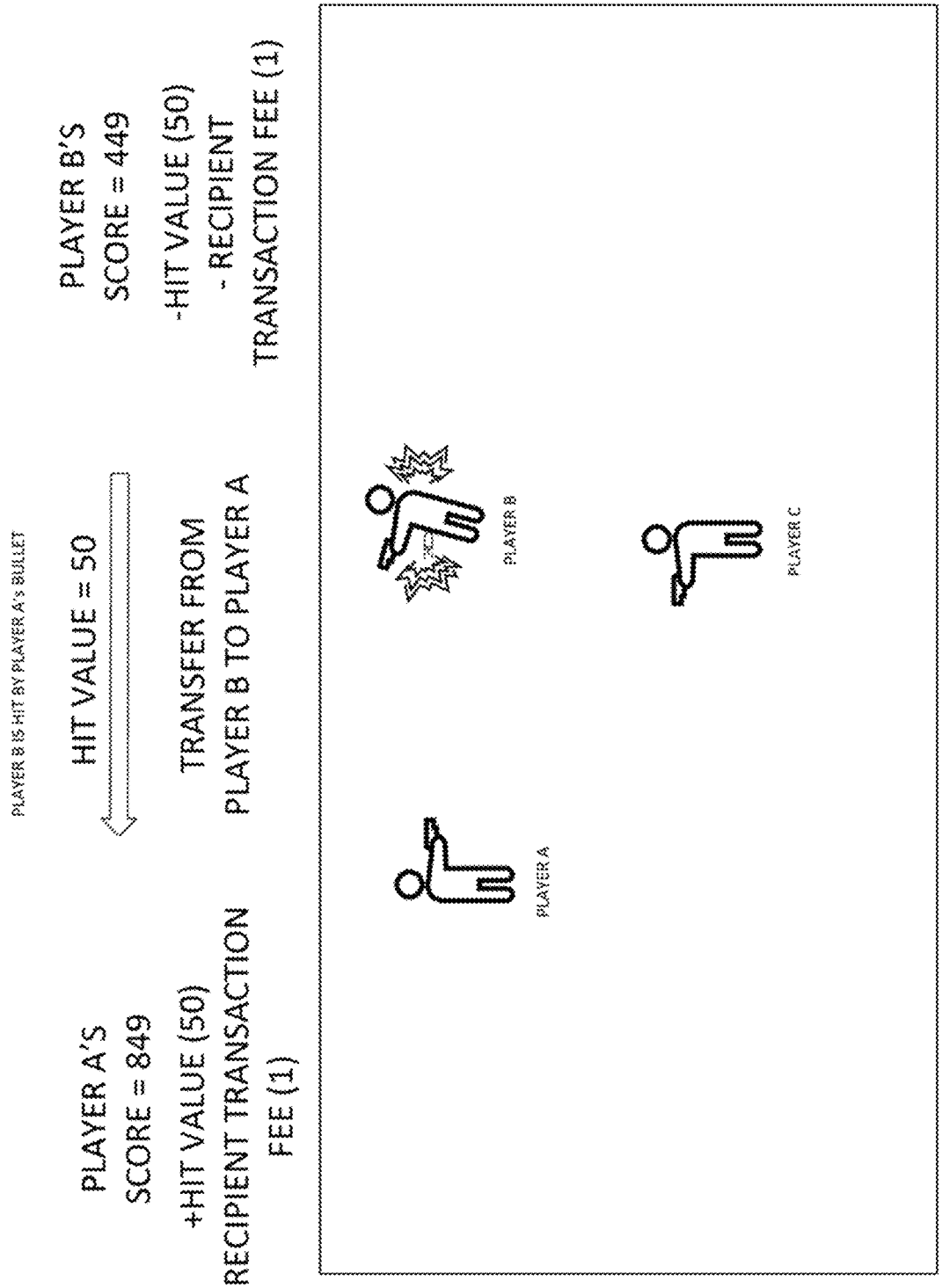
FIG. 9 shows a game scenario involving a bullet hit event, where hit value tokens are transferred from Player B's play token account to Player A's play token account.

FIG. 9 illustrates a game scenario involving a bullet hit event, where hit value tokens are transferred from Player B's play token account to Player A's play token account. In this example, the transaction fee is split, with the token recipient being debited a fraction of the transaction fee and the sender also being debited a fraction of the transaction fee.

Figure 10:
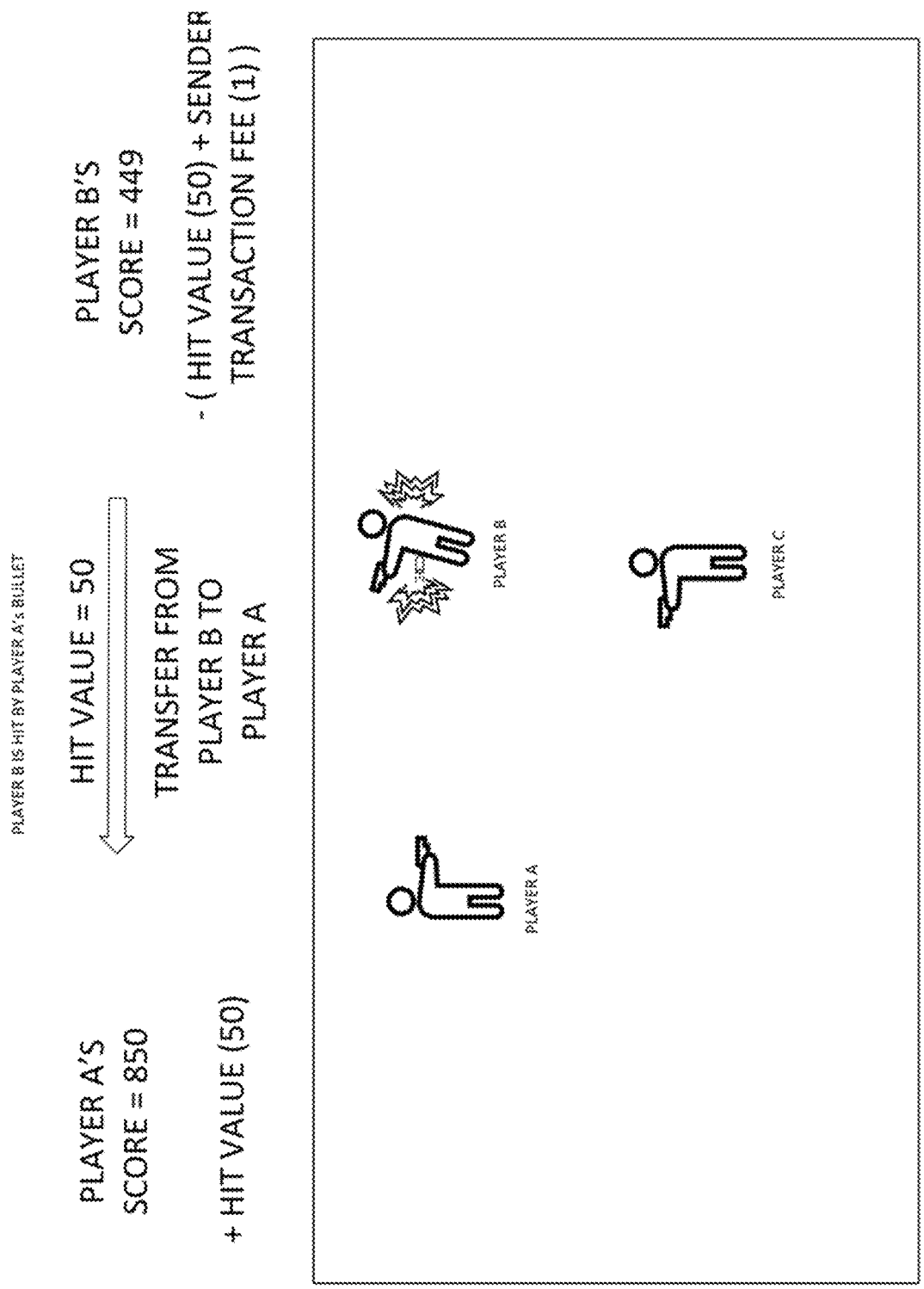
FIG. 10 shows a game scenario involving a bullet hit event, where hit value tokens are transferred from Player B's play token account to Player A's play token account.

FIG. 10 illustrates a game scenario involving a bullet hit event, where hit value tokens are transferred from Player B's play token account to Player A's play token account. In this example, the entire transaction fee is charged to the token sender (Player B).

Figure 11:
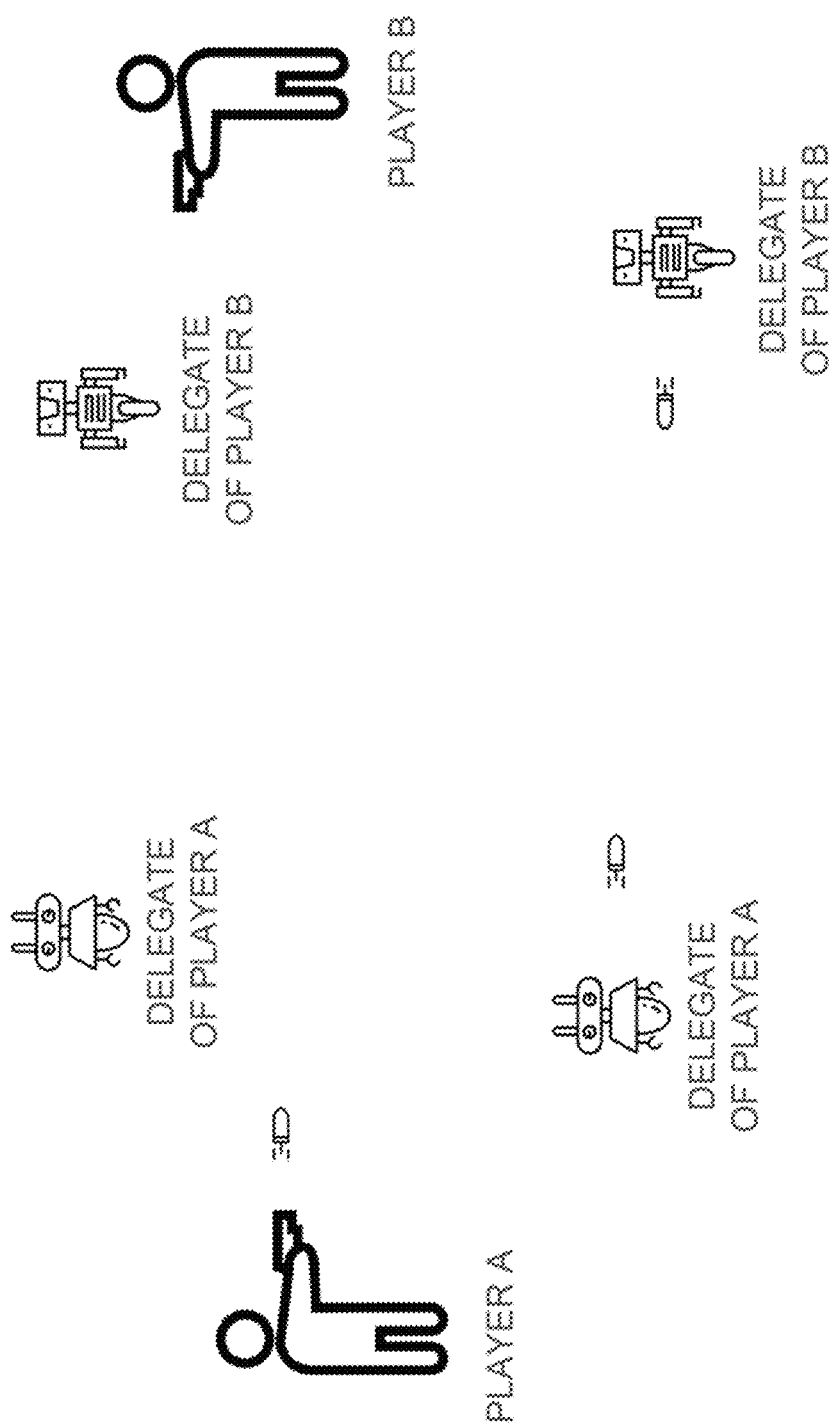
FIG. 11 shows a game scenario featuring player A, player B, player A delegates, player B delegates, a bullet fired by Player A, a bullet fired by a Player A delegate, a bullet fired by a player B delegate.

FIG. 11 illustrates a game scenario featuring player A, player B, player A delegates, player B delegates, a bullet fired by Player A, a bullet fired by a Player A delegate, a bullet fired by a player B delegate.

FIG. 12 provides examples of the relationship between a game player's wallet token balance and the player's in-game score, with the corresponding game score and token balance displayed for each scenario or condition. As described above, various scenarios are possible where for example: the play token balance is equal to the game score, the game score is a multiple or divisor of the play token balance, the play token balance is a multiple or divisor of the game score, the play token balance is not a direct multiple or divisor of the game score but is related in some other predefined manner.

Figure 13:
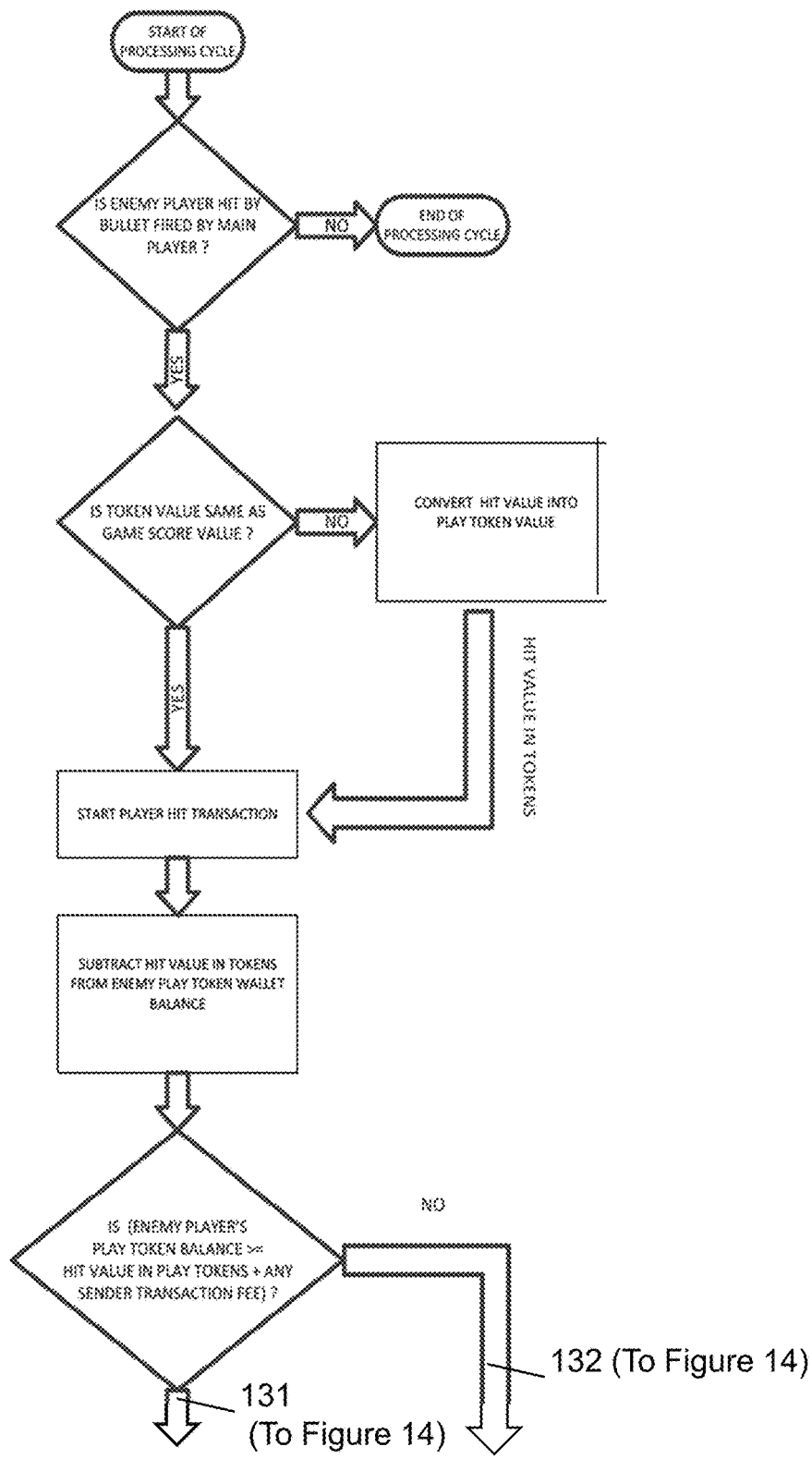
FIG. 13 shows the first portion of a flowchart illustrating the process for handling a player game action that triggers an adjustment of the token balances of each player participating in the online game.
Figure 14:
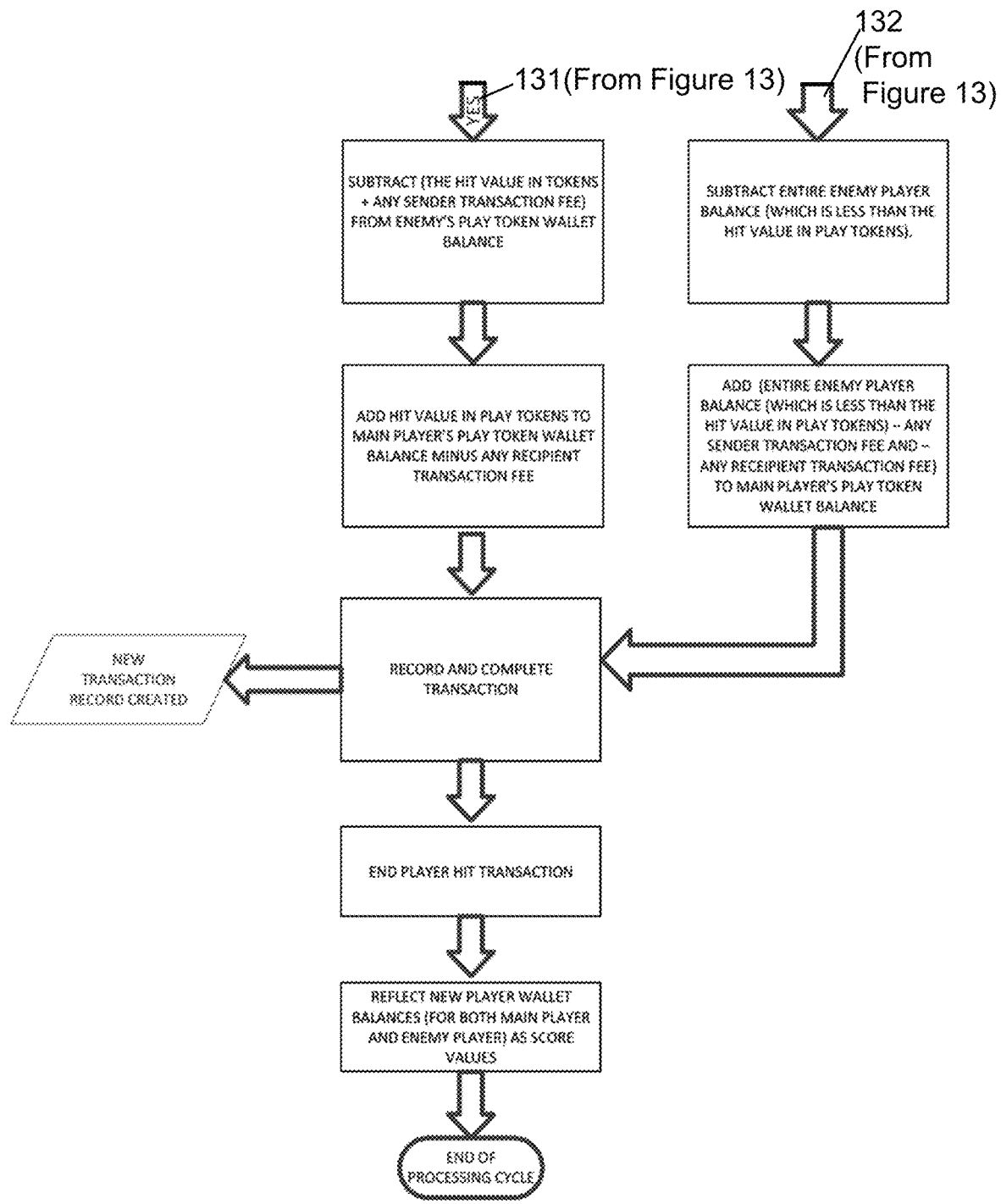
FIG. 14 shows the second portion of a flowchart illustrating the process for handling a player game action that triggers a an adjustment of the token balance of players participating in the online game.

FIGS. 13 and 14 form together a flowchart illustrating the process for handling a player game action that triggers a direct financial transaction between the players participating in the online game. As an example, the flowchart for the token transfer caused by a bullet hitting an enemy player is provided. As shown in FIG. 13, the process starts by checking if an enemy player is hit by a bullet fired by the main player. If the hit occurs, the system verifiers whether the token value is the same as the game score value, converting it to the play token value if needed. The hit value is then deducted in tokens from the enemy's play digital wallet. The system then evaluates whether the remaining balance is sufficient, considering the transaction fee. FIG. 14 shows the remaining possible actions depending on the remaining token balance of the enemy player. The transaction is then recorded and updated on both players' wallet balances.

Figure 15:
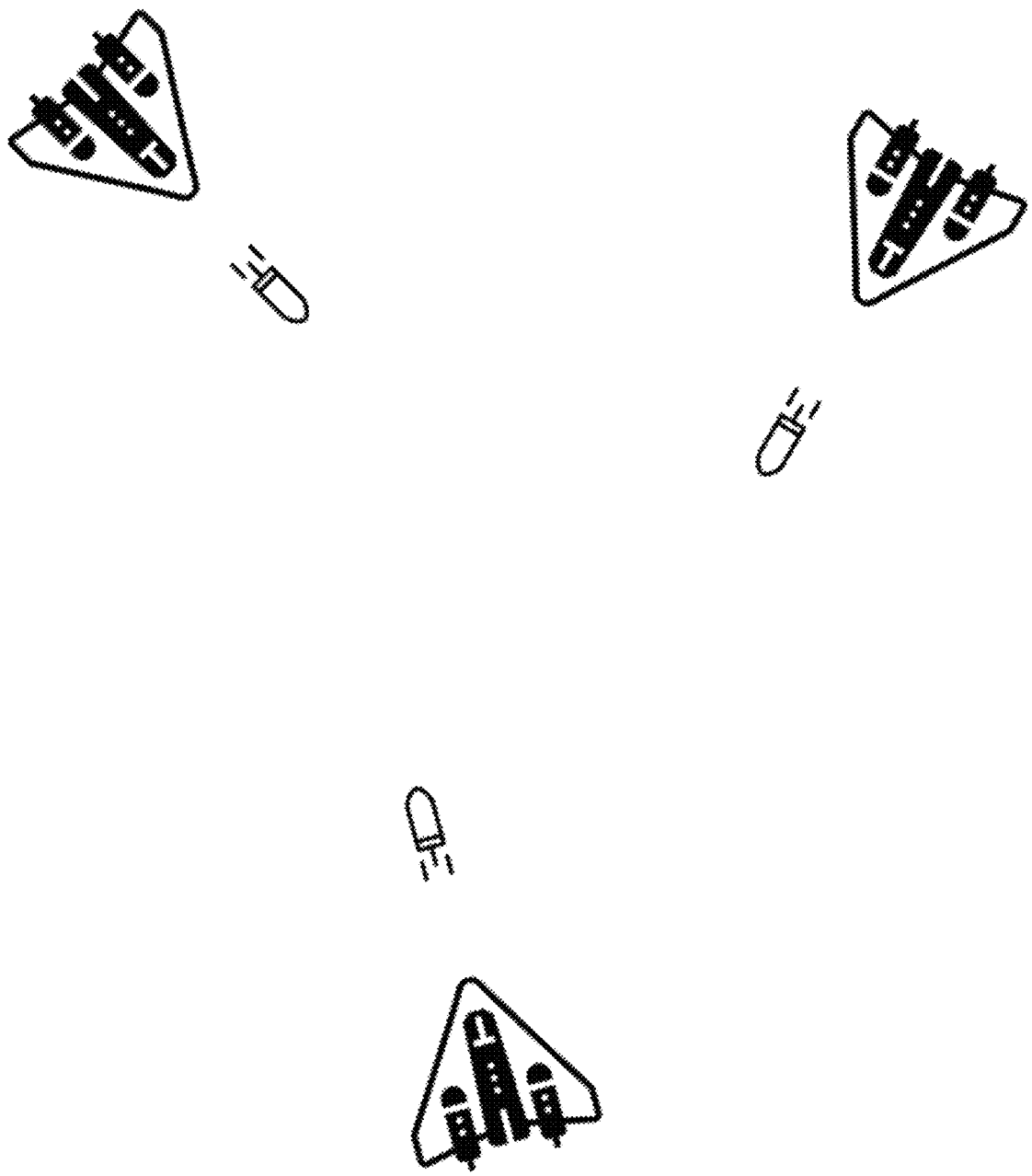
FIG. 15 shows a scenario involving a shooting game with spacecraft.

FIG. 15 illustrates a scenario involving a shooting game with spacecraft.

Figure 16:
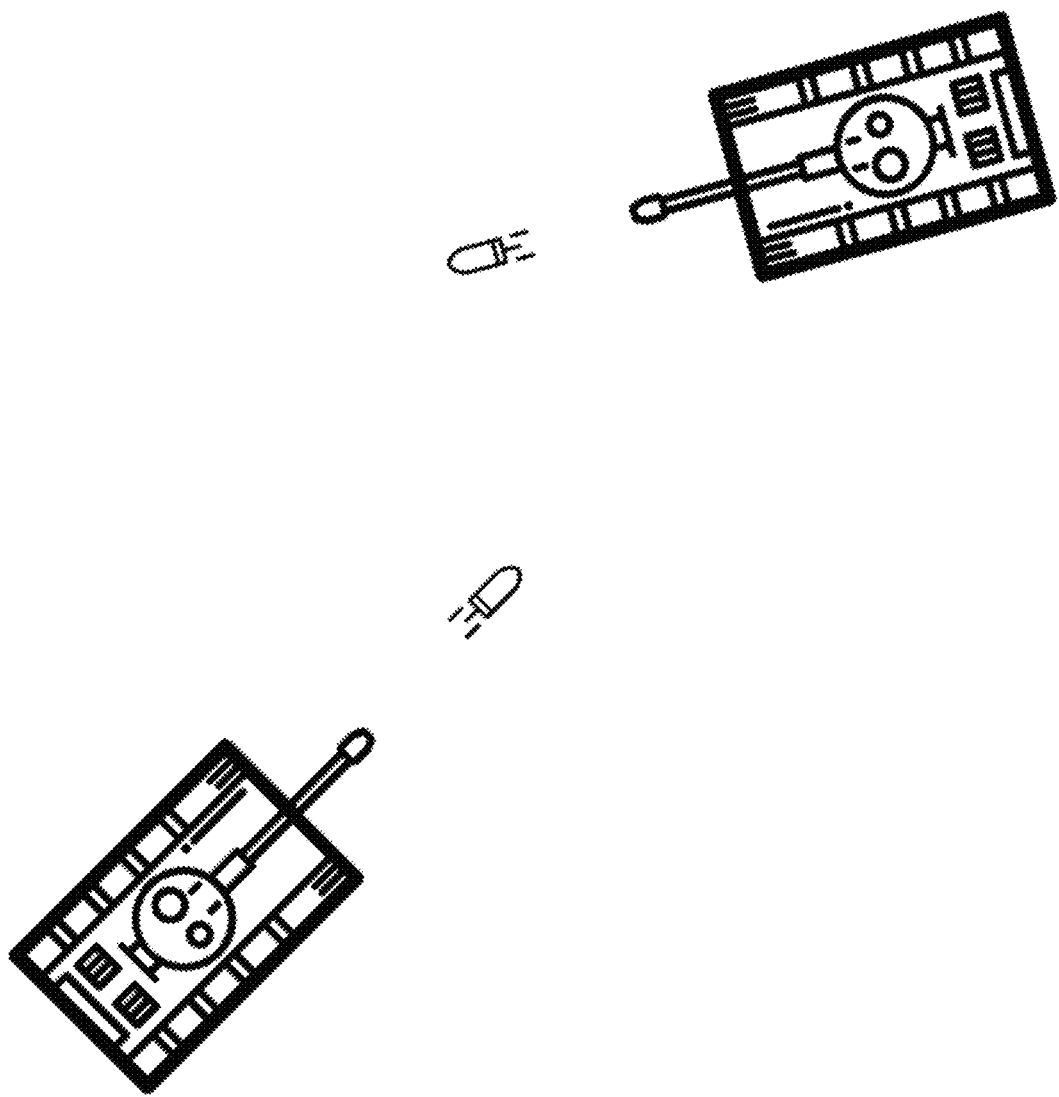
FIG. 16 shows a scenario involving a shooting game with tanks.

FIG. 16 illustrates a scenario involving a shooting game with tanks.

Figure 17:
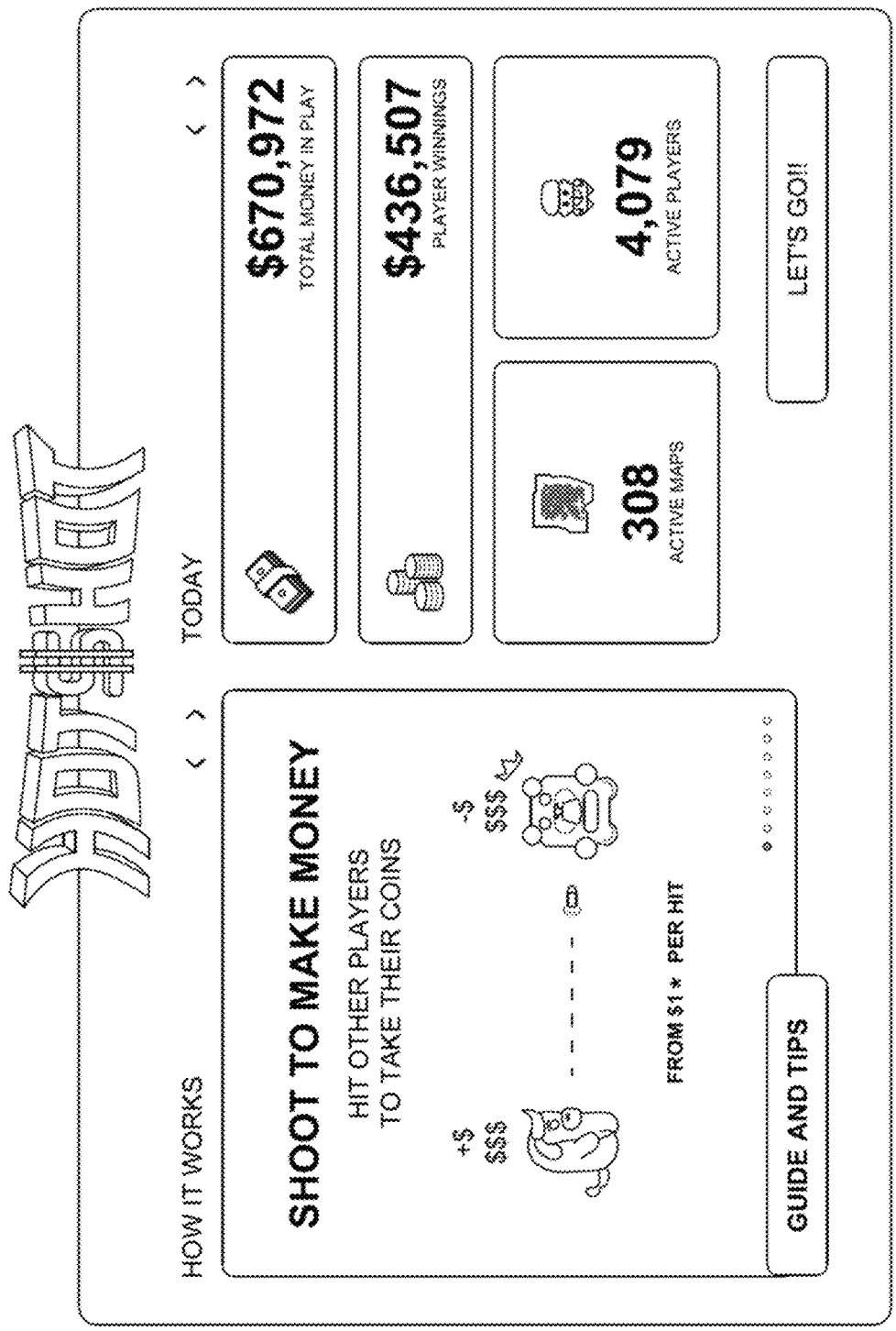
FIG. 17 shows a HOTSHOT game client interface.

FIG. 17 shows a HOTSHOT game client interface, displaying the number of game servers, the total number of players currently playing across all game servers, the total value of play tokens in use, total value of win by any player today or the highest value win achieved by any player today.

FIG. 18 shows a HOTSHOT game client interface, displaying a hall of fame of highest earning players today.

FIG. 19 shows a HOTSHOT game client interface, displaying a hall of fame of highest earning players of all time.

Figure 20:
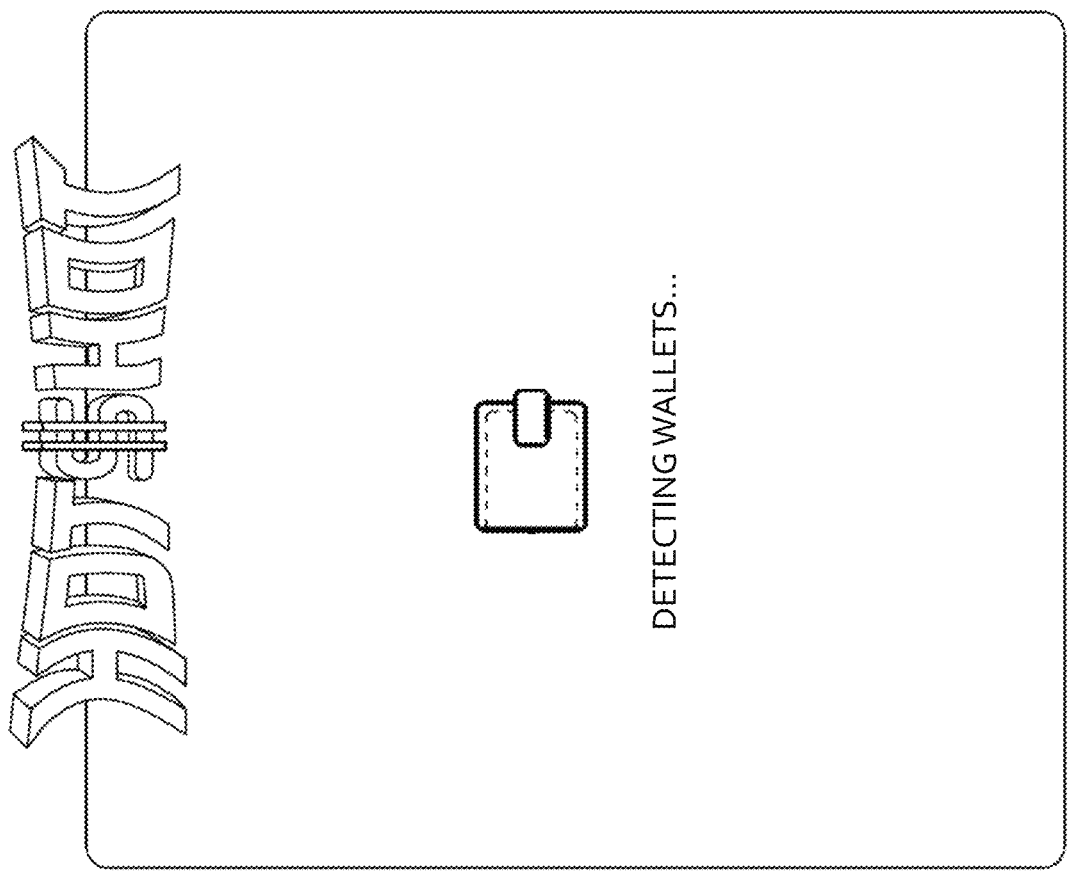
FIG. 20 shows a HOTSHOT game client interface.

FIG. 20 shows a HOTSHOT game client interface, detecting the deployed blockchain wallets available on the game client system.

Figure 21:
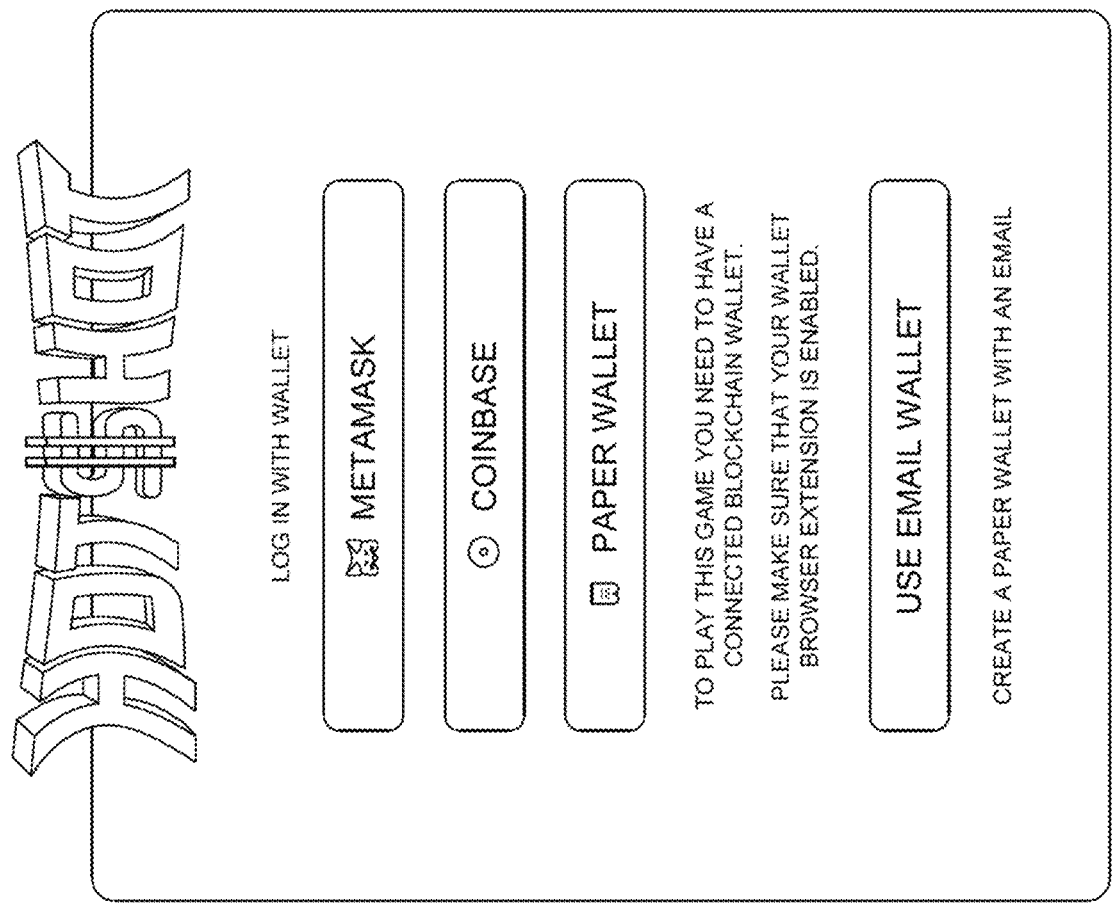
FIG. 21 shows a HOTSHOT game client interface.

FIG. 21 shows a HOTSHOT game client interface, displaying the detected blockchain wallets deployed on the client system, along with the email verification option.

Figure 22:
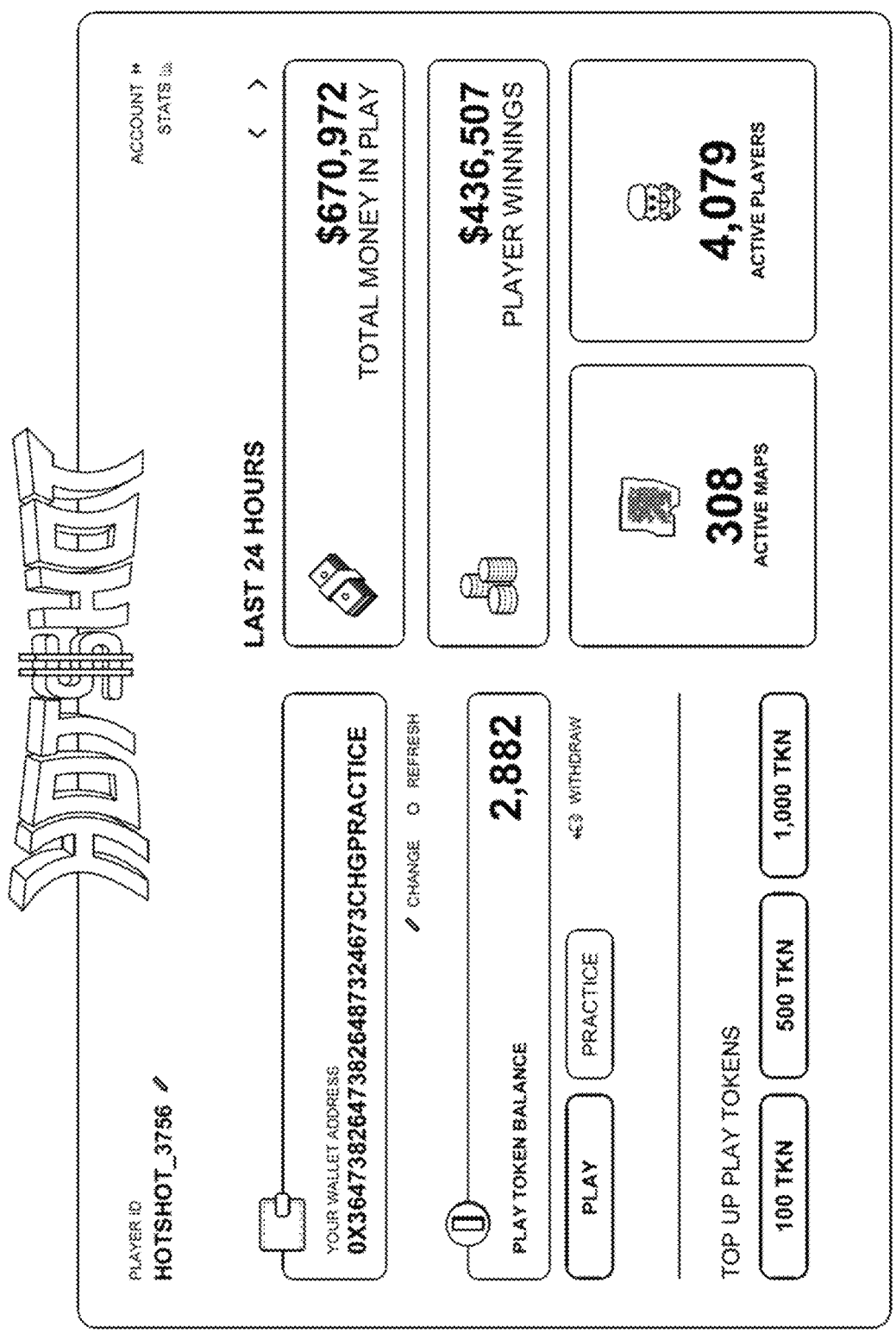
FIG. 22 shows a HOTSHOT game client interface.

FIG. 22 shows a HOTSHOT game client interface, displaying the authenticated user using the game client, along with their player alias, their blockchain wallet address, their play token balance, the play token top up options, the number of game server instantiated, the total number of players currently playing across all game servers, total value of play tokens in play now, total value of highest value win by any player today.

Figure 23:
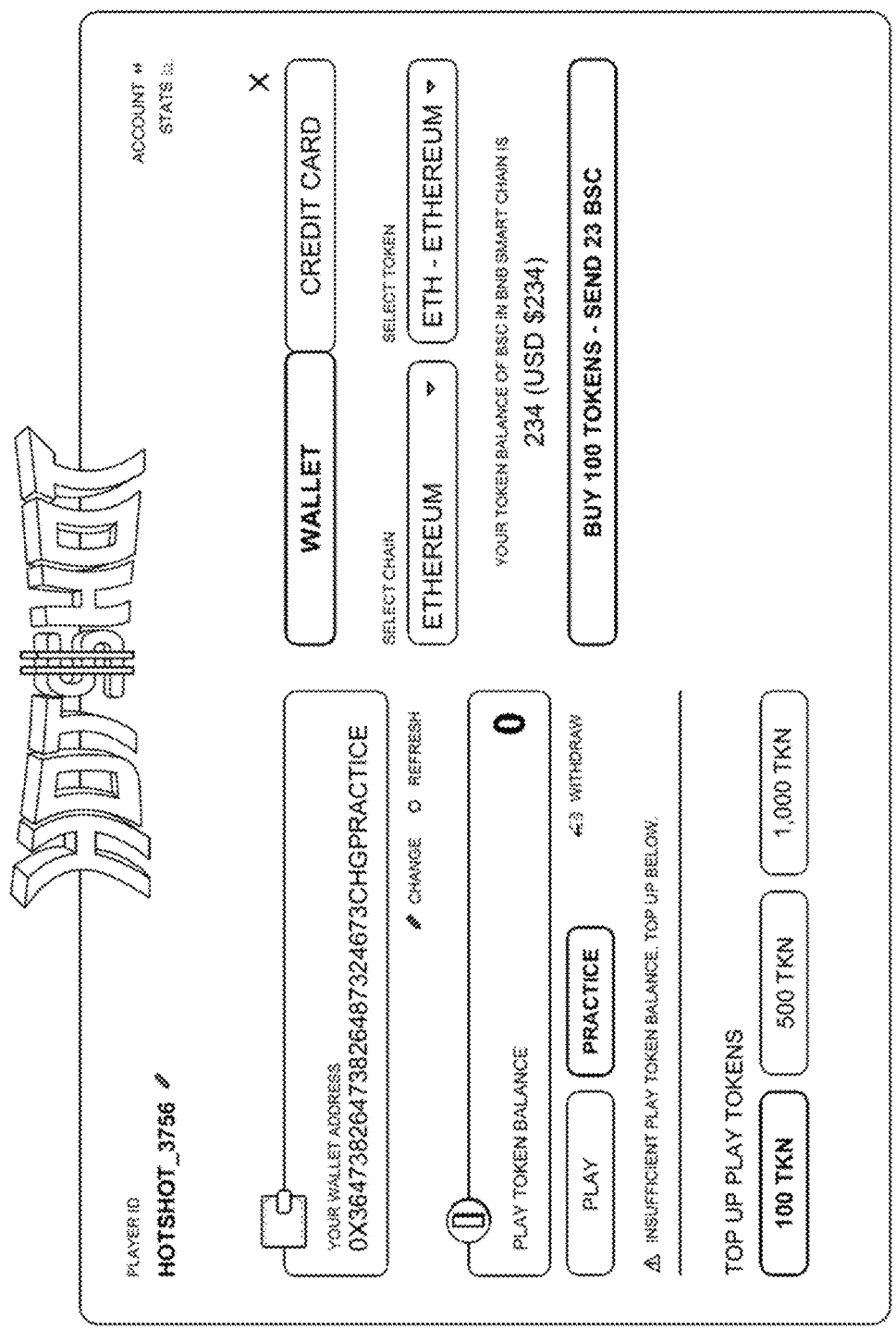
FIG. 23 shows a HOTSHOT game client interface.

FIG. 23 shows a HOTSHOT game client interface, displaying an authenticated user using the game client, along with their player alias, their blockchain wallet address, and a top up of 100 play tokens using the player's blockchain account—in this case the user is selecting Ethereum as the blockchain and cryptocurrency.

Figure 24:
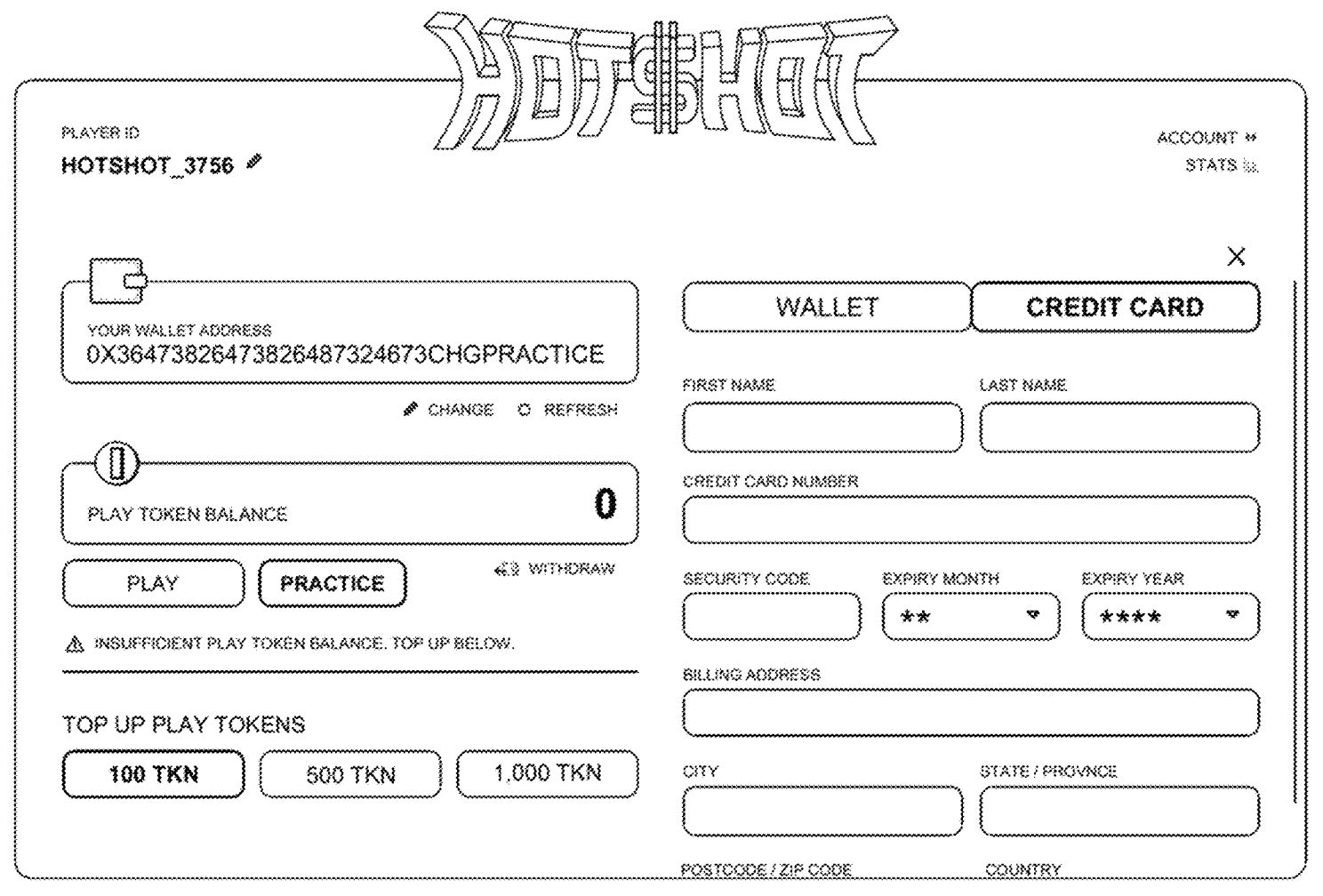

FIG. 24 shows a HOTSHOT game client interface, displaying an authenticated user using the game client, along with their player alias, their blockchain wallet address, and a purchase of 100 play tokens using a credit card.

Figure 25:
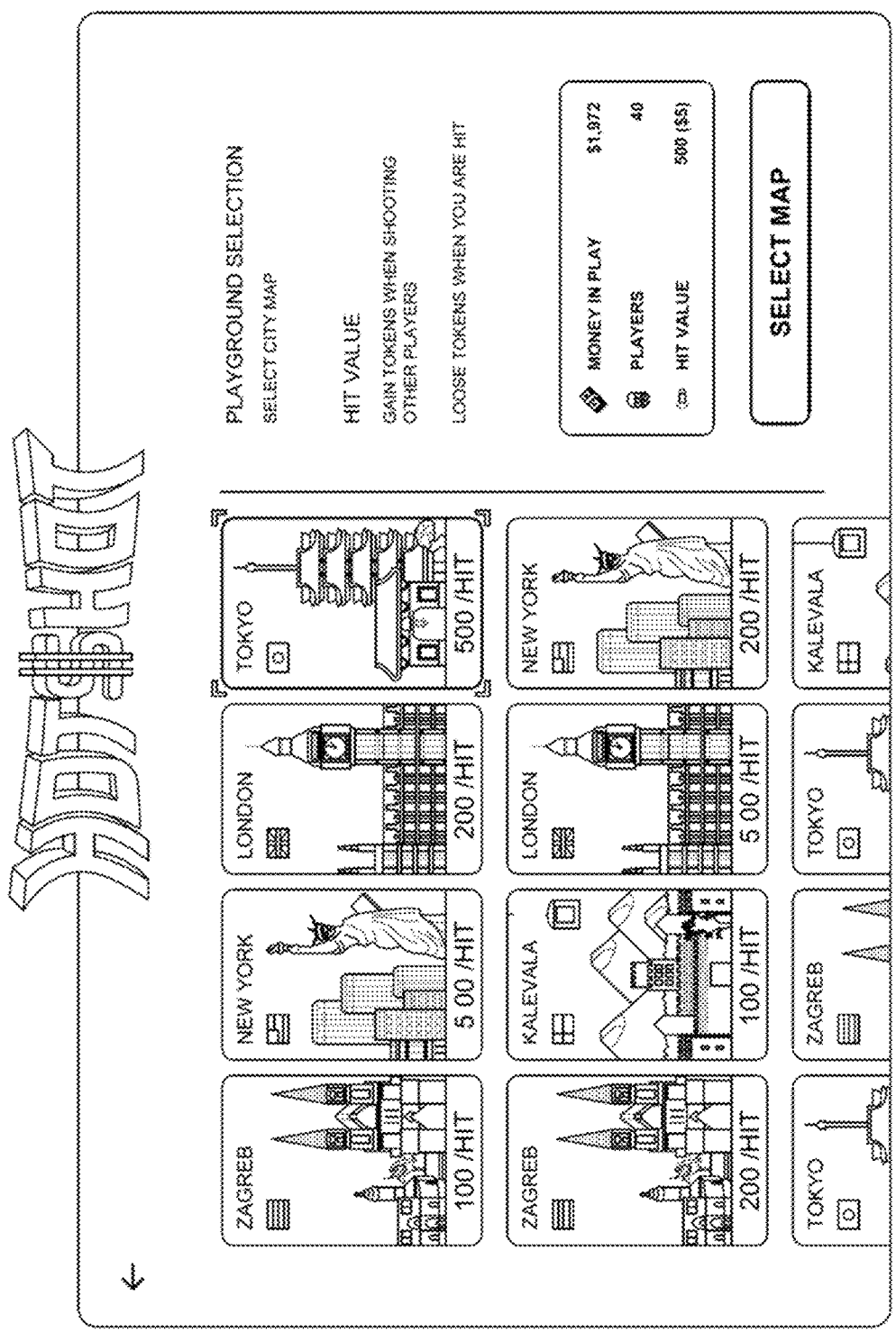
FIG. 25 shows a HOTSHOT game client interface.

FIG. 25 shows a HOTSHOT game client interface, displaying a selection screen for game servers with different area maps and different player hit values.

Figure 26:
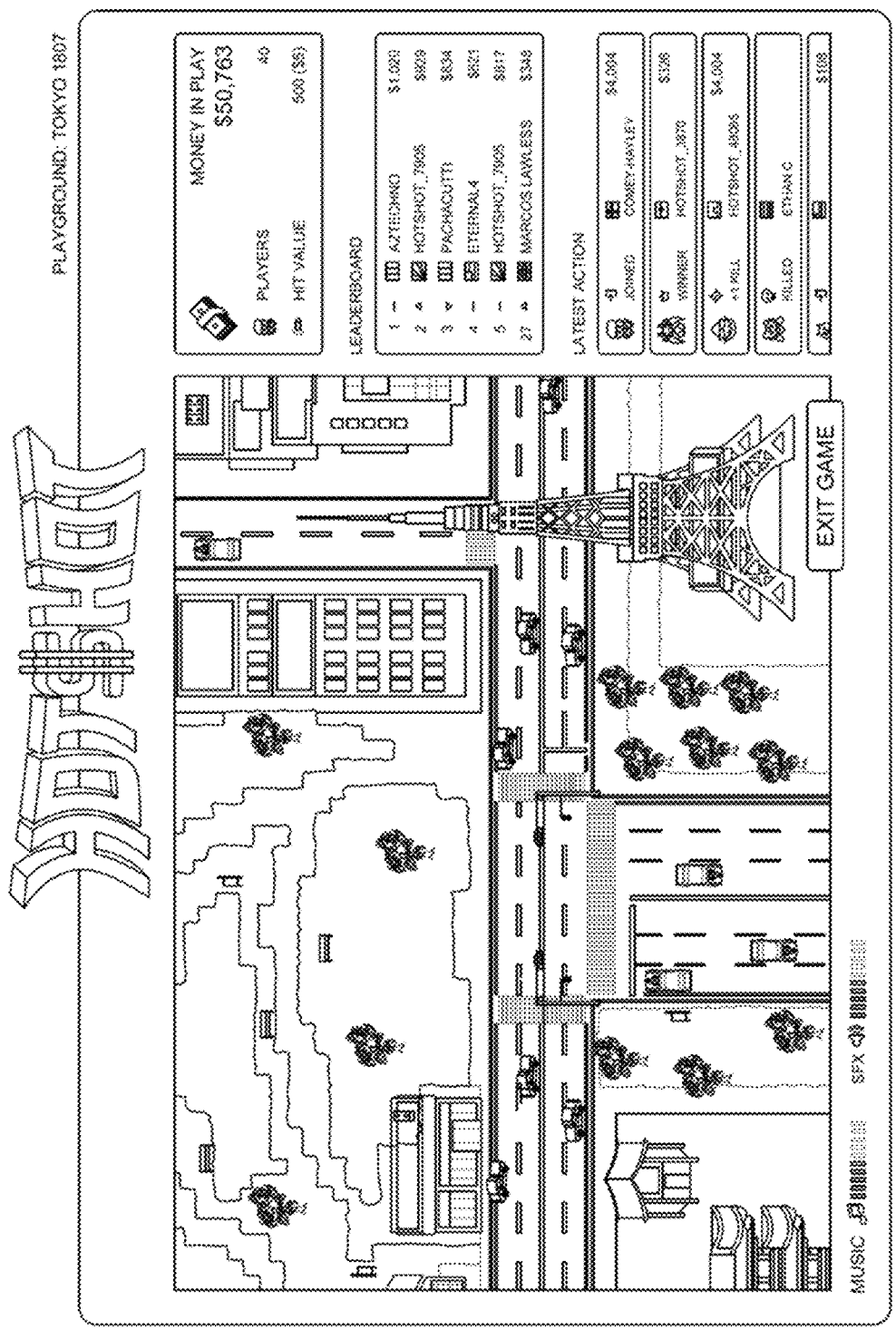
FIG. 26 shows a HOTSHOT game client interface.

FIG. 26 shows a HOTSHOT game client interface, displaying the chief main game screen with the game area map, total value in play, the number of players in the game, the hit value in the game, the leaderboard of players in the game including values. The latest game server notifications shown to the player may also be displayed.

Figure 27:
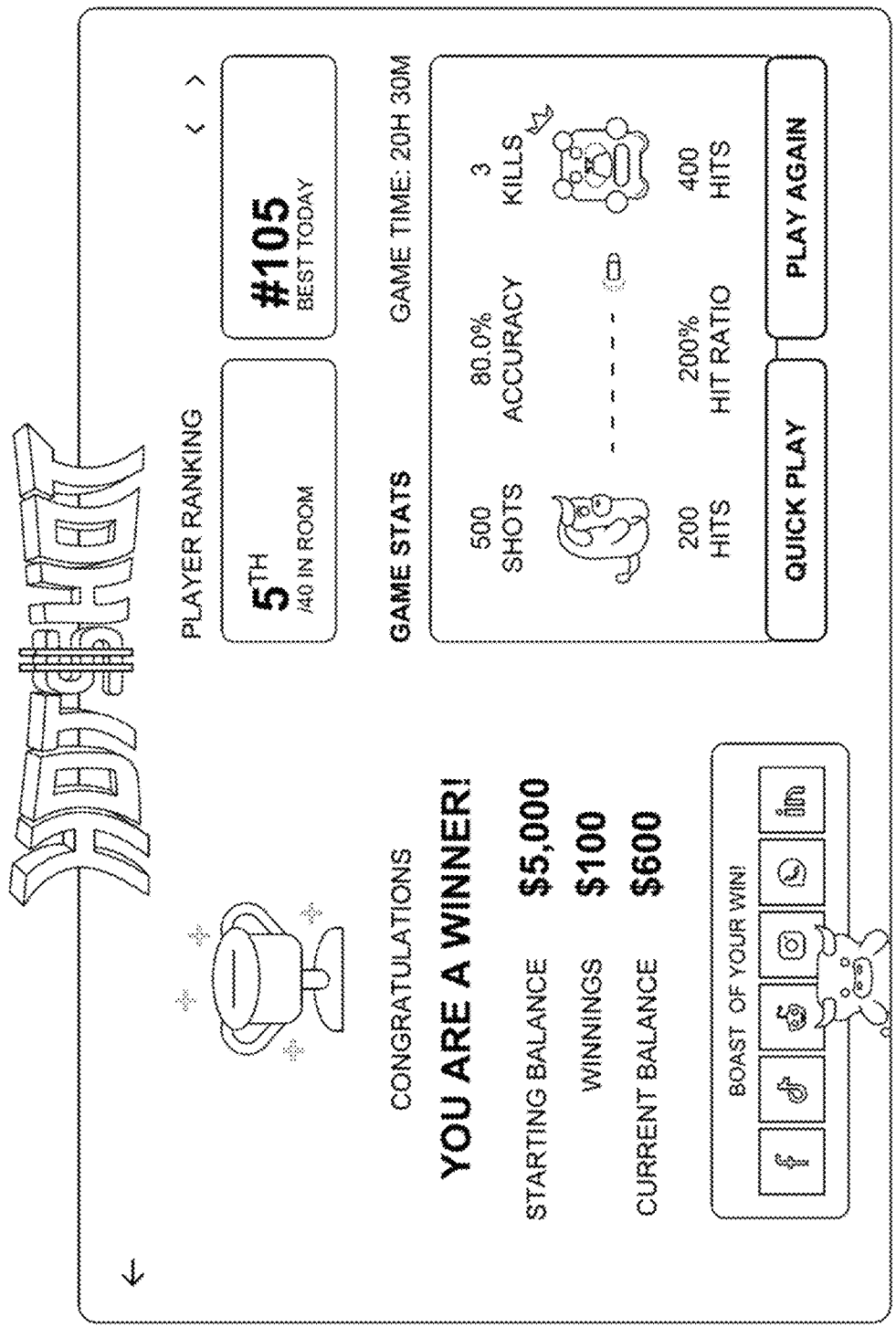
FIG. 27 shows a HOTSHOT game client interface.

FIG. 27 shows a HOTSHOT game client interface, displaying an exit screen when the player has increased the balance of their player account token balance.

Figure 28:
FIG. 28 shows a HOTSHOT game client interface.

FIG. 28 shows a HOTSHOT game client interface, displaying a waiting screen as the backend game systems process a financial transaction.

Figure 29:
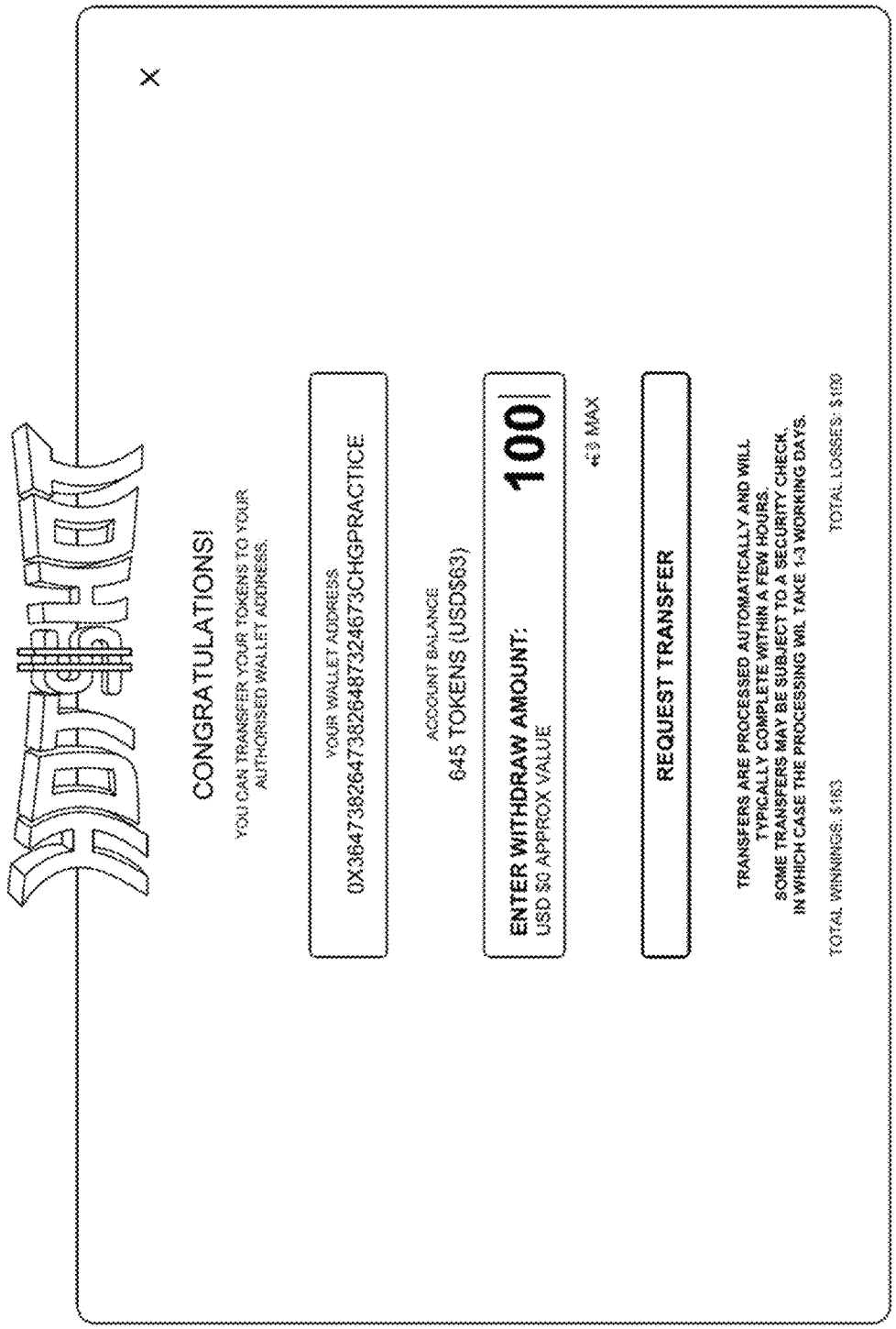
FIG. 29 shows a HOTSHOT game client interface.

FIG. 29 shows a HOTSHOT game client interface, displaying a play token withdrawal request screen.

FIG. 30 shows a HOTSHOT game client interface, displaying the transaction history of a player's play token account.

Figure 31:
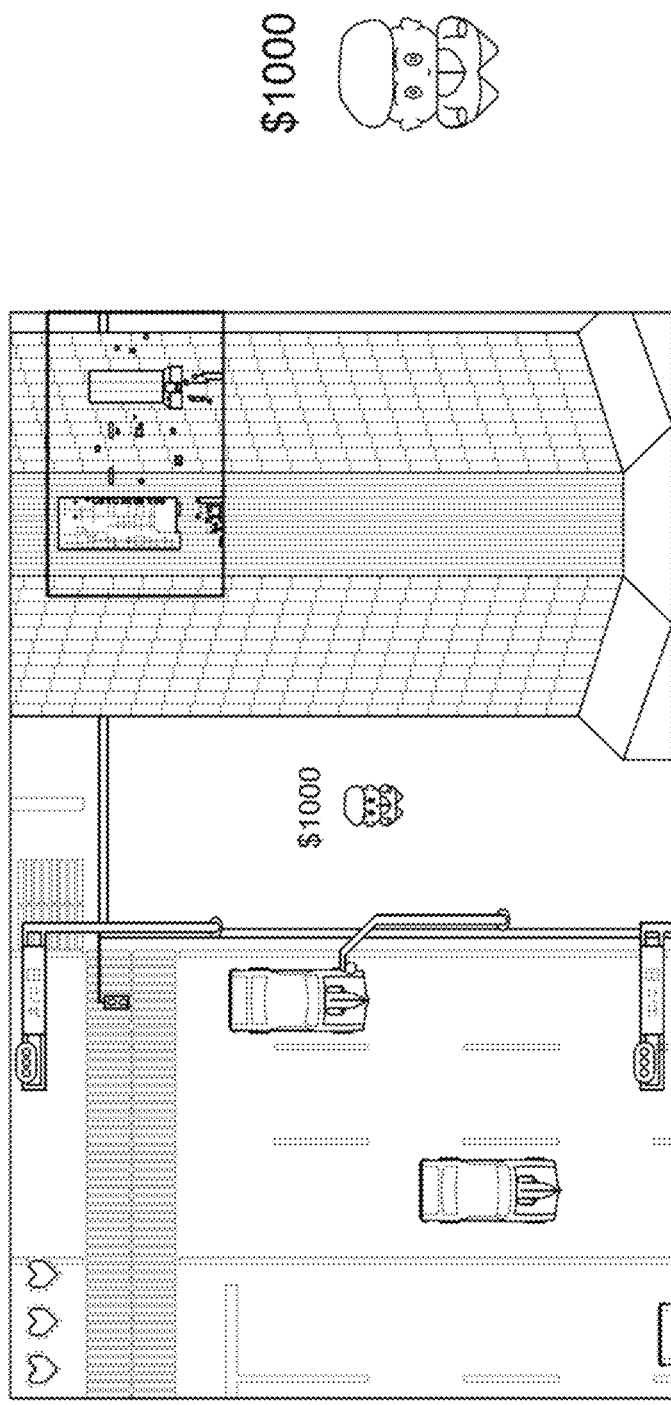
FIG. 31 shows a HOTSHOT game client interface.

FIG. 31 shows a HOTSHOT game client interface, displaying showing a player character sprite with the value of the player's account token balance above the character.

Figure 32:
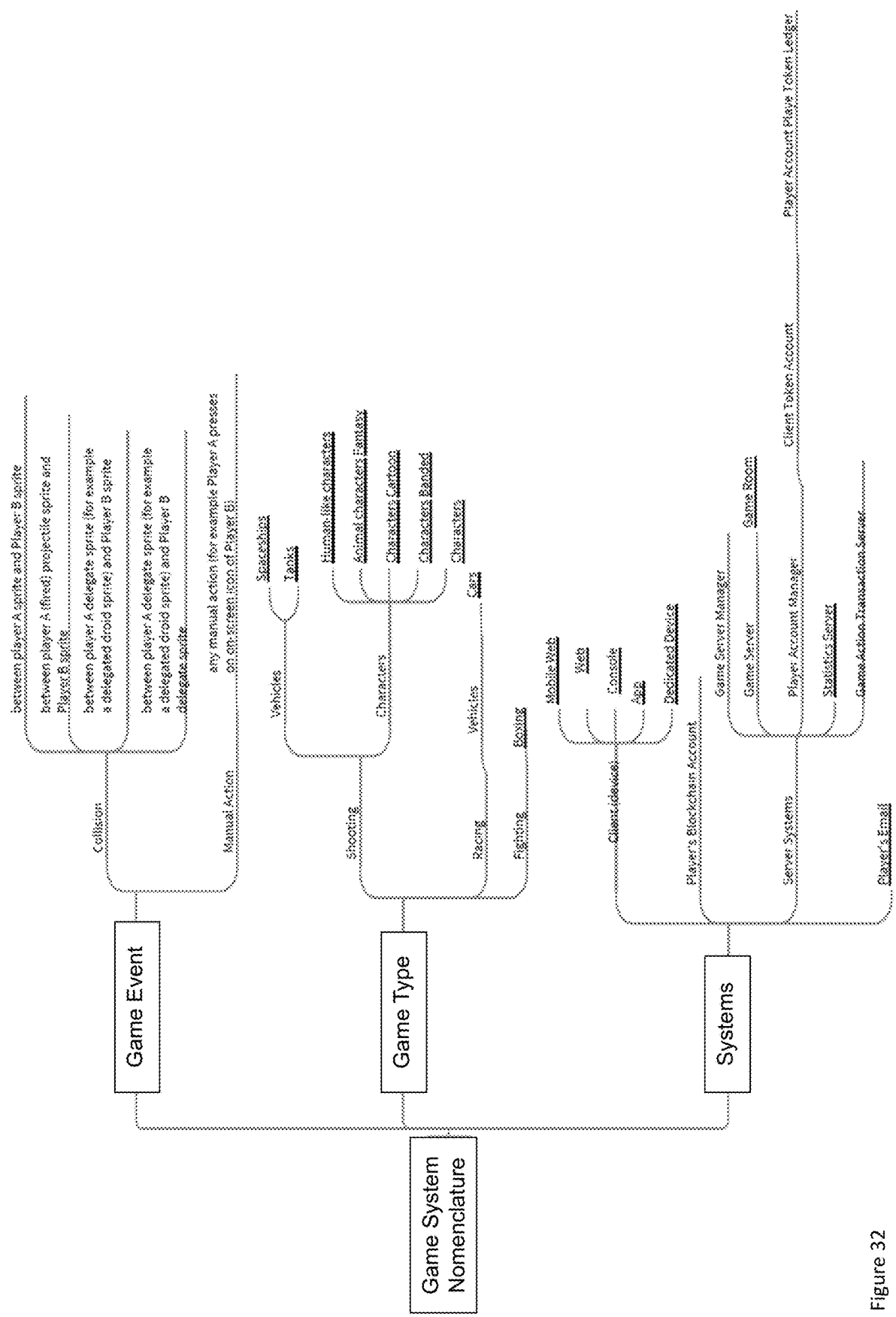
FIG. 32 shows a diagram illustrating the nomenclature of the game system.

FIG. 32 shows a diagram illustrating the nomenclature of the game system.

FIG. 33 illustrates screenshots from the computer device display of both player A and player B, showing their respective balances or game scores prior to the initiation of a game action. The game interface 331 displayed on player A's computer display shows a balance of 6,049 play tokens. The game interface 332 displayed on player B's computer display shows a balance of 9,691 play tokens.

Figure 34:
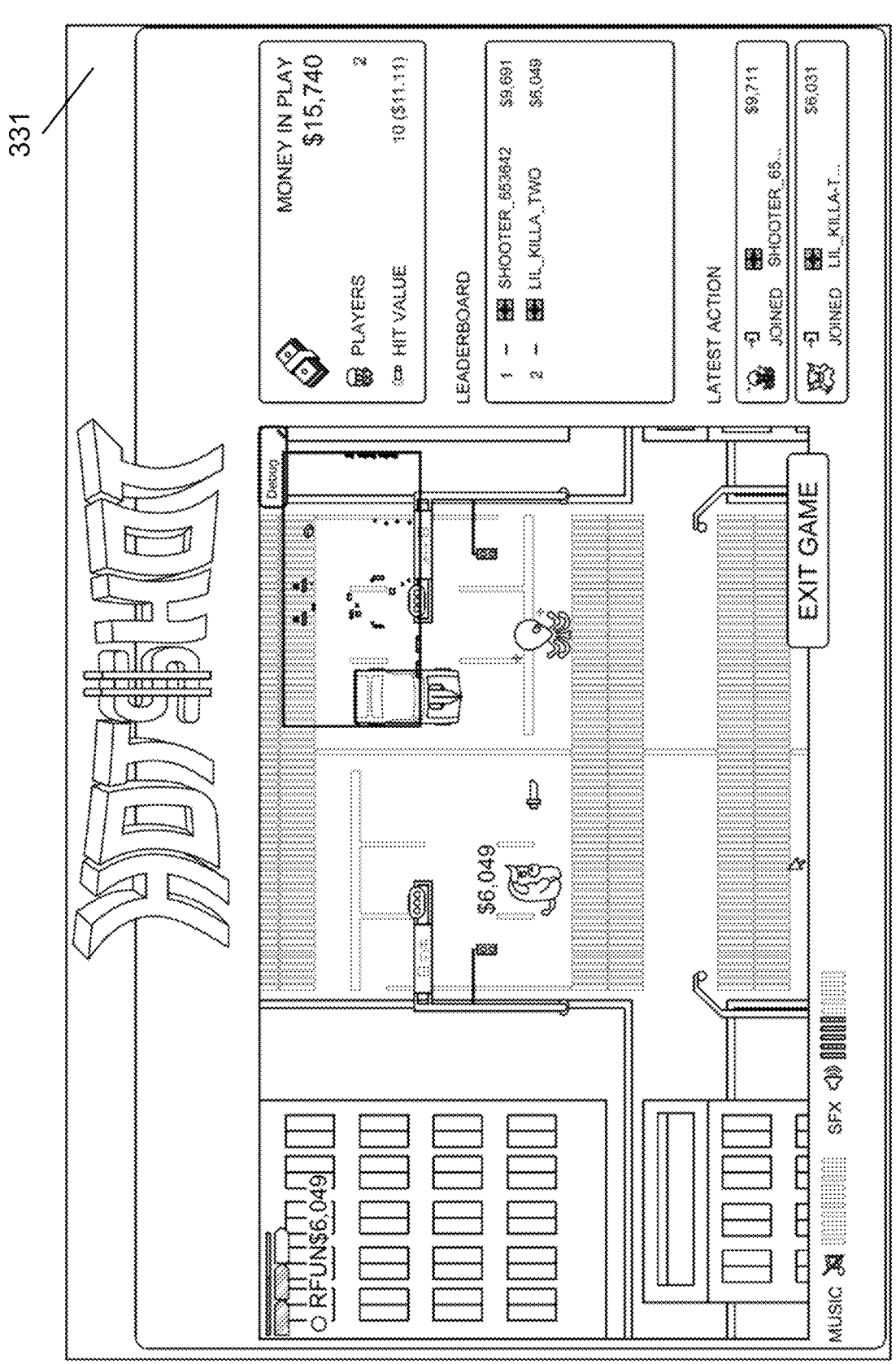
FIG. 34 shows a screenshot from player A's computer device display 331 showing player A initiating an action by firing a projectile or knife toward player B.

FIG. 34 illustrates a screenshot from player A's computer device display 331 showing player A initiating an action by firing a projectile or knife toward player B.

FIG. 35 illustrates screenshots from the computer device display of both player A and player B, showing their respective balances or game scores being altered at substantially the same time as the event of player B being hit by player A. The game interface 331 displayed on player A's computer display shows a balance of 6,058 play tokens. The game interface 332 displayed on player B's computer display shows a balance of 9,681 play tokens.

Hence balances or game scores are simultaneously updated following a specific game action. This demonstrates the dynamic interaction between in-game players, and the immediate or substantially immediate in-game feedback that results from their in-game actions.

Alternatively, the methods and systems can be generalized to other game actions, such as to cover team-based games where transactions happen between multiple players simultaneously.

Player-to-Player Lending

Hence, players may be allowed to borrow tokens from others during gameplay, with player-to-player lending integrated with the existing digital wallet system. Players may lend tokens to other players, creating a player-driven financial ecosystem within the game. Loans can be enforced via smart contracts, with repayment terms and interest rates customizable by the lender.

Adaptive Transaction Fees

Adaptive transaction fees may be applied based on player performance or action frequency. For example, high-performing players may face higher fees, which would balance the in-game economy and encourage fair play.

Handicaps or Tiered Competition

The system can also introduce handicaps or tiered competition, wherein handicaps can be used to level playing field by adjusting in-game attributes, such as output or rewards, based on player's token balances.

Real-World Integration

Players can redeem tokens earned in the game for real-world goods or services, either via partnerships with external vendors or by converting game tokens to cryptocurrency on blockchain exchanges.

Fraud Detection or Security

The system may include a machine-learning-powered fraud detection algorithm that analyzes transaction patterns to identify unusual behavior, flagging potential fraud or unauthorized activity.

For example, the system employs cryptographic techniques such as SHA-256 hashing and utilizes consensus mechanisms (e.g., Proof of Stake) to prevent double-spending and ensure transaction validity.

To address scalability, the system may also implement layer 2 solutions such as sidechains, which allow off-chain transactions to be validated periodically on the main blockchain, significantly reducing transaction costs and processing times.

Integration with Non-Gaming Applications

The features described can also be adapted to non-gaming environments, including virtual worlds, social media platforms, or metaverse-style interactions, where users engage in player-to-player financial transactions based on pre-defined social interactions or events.

Appendix A: Key Features

This section summarises the most important high-level features (Concept A, Concept B, and Concept C); an implementation of the invention may include one or more of these high-level features, or any combination of any of these. Note that each high-level feature is therefore potentially a stand-alone invention and may be combined with any one or more other high-level feature or key dependent features or any of the dependent features.

Concept A-In-Game Direct Player to Player Transactions

Computer implemented method for enabling interactions between players participating in a multi-player online game, the method comprising:
  (a) providing or making available the multi-player online game to each player's computing device;
  (b) providing or making available to the players a digital wallet or account that is configured to store and transact game tokens, currency, fiat currency or cryptocurrency, where the digital wallet or account is based on a ledger, blockchain, distributed ledger, centralised ledger or any other data structure;
  (c) triggering a direct financial transaction between the players participating in the online game based on the occurrence of a specific game action, where the direct financial transaction involves a game token, currency, fiat currency or cryptocurrency debit to one player and a related or corresponding game token, currency, fiat currency or cryptocurrency credit to another player that is triggered at substantially the same time as the occurrence of specific game action;
  (d) displaying on each player's computing device the balance or value of their digital wallet or account at substantially the same time as the occurrence of the specific game action.

Computer implemented system for enabling interactions between players participating in a multi-player online game, the system comprising:
  (a) a game server configured to provide or make available the multi-player online game to each player's computing device;
  (b) a digital wallet or account that is configured to store and transact game tokens, currency, fiat currency or cryptocurrency, where the digital wallet or account is based on a ledger, blockchain, distributed ledger, centralised ledger or any other data structure;
  (c) a transaction module subsystem configured to trigger a direct financial transaction between the players participating in the online game based on the occurrence of a specific game action, where the direct financial transaction involves a game token, currency, fiat currency or cryptocurrency debit to one player and a related or corresponding game token, currency, fiat currency or cryptocurrency credit to another player that is triggered at substantially the same time as the specific game action and where the transaction module subsystem is also configured to cause the game server to display on each player's computing device the balance or value of the digital wallet or account at substantially the same time as the occurrence of the specific game action.

Concept B-Ledger-Based Multiplayer Game with Game Tokens, Currency or Cryptocurrency Game Score Computer implemented method for calculating scores for players participating in a multi-player online game, the method comprising:
  (a) providing or making available the multi-player online game to each player's computing device;
  (b) generating player scores for the game depending on player actions and interactions;
  (c) providing or making available to the players a digital wallet or account that is configured to store and manage game tokens, currency, fiat currency or crypto currency, where the digital wallet or account is based on a ledger, blockchain, distributed ledger, centralised ledger, or any other data structure;
  (d) adjusting each player's token balance on the digital wallet or account based on player actions and interactions; and
  (e) displaying on each player's computing device each player's game score, which is dynamically linked to their token balance.

Computer implemented system for calculating scores for players participating in a multi-player online game, the system comprising:
  (a) a game server configured to provide or make available the multi-player online game to each player's computing device and to generate player scores for the game depending on player actions and interactions;
  (b) a digital wallet or account that is configured to store and manage game tokens, currency, fiat currency or crypto currency, where the digital wallet is based on a ledger, blockchain, distributed ledger, centralised ledger or any other data structure; and
  (c) a transaction module subsystem configured to (i) adjust each player's token balance or value on the digital wallet or account based on player actions and interactions and (ii) display on each player's game score, which is dynamically linked to their token balance.

Concept C-Real-Time Token Balance Adjustments Triggered by Specific Game Actions Computer implemented method for enabling interactions between players participating in a multi-player online game, the method comprising:
  providing or making available the multi-player online game to each player's computing device;
  (b) providing or making available to the players a digital wallet or account that is configured to store and manage game tokens, where the digital wallet or account is based on a ledger, blockchain, distributed ledger, centralised ledger or any other data structure;
  (c) triggering an adjustment to the token balances of players participating in the online game based on the occurrence of a specific game action, where the token balance adjustment is triggered at substantially the same time as the occurrence of specific game action;
  (d) displaying on each player's computing device their updated token balance at substantially the same time as the occurrence of the specific game action.

Computer implemented system for enabling interactions between players participating in a multi-player online game, the system comprising:
  (a) a game sever configured to provide or make available the multi-player online game to each player's computing device;
  (b) a digital wallet or account that is configured to store and manage game tokens, where the digital wallet or account is based on a ledger, blockchain, distributed ledger, centralised ledger or any other data structure;
  (c) a transaction module subsystem configured to (i) trigger an adjustment to the token balances of players participating in the online game based on the occurrence of a specific game action, where the token balance adjustment is triggered at substantially the same time as the occurrence of the specific game action; and is also configured to (ii) cause the game server to display on each player's computing device their updated token balance at substantially the same time as the occurrence of the specific game action.

Optional features of any of the above concepts may include one or more of the following:

Direct Financial Transactions
  direct financial transaction occurs exclusively between two players, such as the debit applied to one player's digital wallet or account and the credit is applied to the digital wallet or account to the other player.
  the amount debited from the first player's digital wallet or account is equal to the amount credited to the second player's digital wallet or account, save for any applicable transaction fees.
  the transaction fees are deducted from the amount credited to the second player's digital wallet or account, the amount debited from the first player's digital wallet or account or split between the two players as predefined by the game system.
  value of the transaction is directly linked to a specific game action.
  the direct financial transaction involves a debit from one player's digital wallet or account and corresponding credits to multiple player's digital wallets or accounts, such that the total credited amount equals the debited amount, save for any applicable transaction fees.
  the direct financial transaction involves debits from multiple players' digital wallets or accounts and a corresponding credit to one player's digital wallet or account, such that the total debited amount equals the credited amount, save for any applicable transaction fees.
  the transaction fees are dynamically determined based on predefined conditions, including the type of in-game action, the value of the transaction, or the performance of the players involved.
  the digital wallet is further configured to enable players to use or manage or transfer game tokens, currency, fiat currency or cryptocurrency in order to purchase goods or services that are external to the online game environment.
  direct financial transactions occur in real time during gameplay and involves direct player-to-player transfers between players' digital wallets without intermediate processing by a centralized server.
  the direct financial transaction occurs at substantially the same time, or immediately after, each game action that triggers the transaction.
  the real-time transaction process guarantees latency under 200 milliseconds, such as by using edge servers geographically close to the players.

the direct transaction occurs and is displayed on each affected player's computing device at substantially the same time, or immediately after, each game action that triggers the transaction.

each direct financial transaction is made up of, and displayed on the players' computing device, as a currency, fiat currency or cryptocurrency debit to one player and a matching currency, fiat currency or cryptocurrency credit to another player, less a transaction or processing fee.

altering each player's balance or value on the digital wallet occurs in real time during gameplay depending on the occurrence of the specific game action.

altering each player's balance or value on the digital wallet occurs at substantially the same time as the occurrence of the specific game action.

the direct financial transaction is cryptographically secured and recorded on a blockchain or distributed ledger.

triggering a financial transaction is implemented through a smart contract deployed on an Ethereum-based blockchain, where the smart contract ensures immutability and transparency of in-game currency transfers.

the players can create and manage their custom smart contracts within the game, facilitating more complex in-game interactions.

a portion of the processing fee is distributed to the game operator or developer.

the financial transactions are logged for auditing or fraud detection purposes.

a percentage of each transaction is donated to a player-selected charity or cause.

game operator charges different transaction fees depending on the specific action or transaction volume.

in-game assets, such as weapons, can be transferred alongside the currency in the same transaction.

in-game advertising is used to reduce or eliminate the transaction fees for players.

Altering Each Player's Balance or Value on the Digital Wallet Depending on Player Actions and Interactions altering each player's balance or value on the digital wallet occurs in real time during gameplay depending on the player actions and interactions.

altering each player's balance or value on the digital wallet occurs at substantially the same time as the occurrence of the related player actions and interaction.

altering each player's balance or value on the digital wallet involves making a currency, fiat currency or cryptocurrency debit to one player and a matching currency, fiat currency or cryptocurrency credit to another player.

altering each player's balance or value on the digital wallet involves making a currency, fiat currency or cryptocurrency debit to one player and a matching currency, fiat currency or cryptocurrency credit to another player, less a transaction or processing fee.

each player's balance is displayed on that player's computing device and is updated at substantially the same time, or immediately after, each player actions and interactions that triggers the change in the balance.

the ledger, blockchain, distributed ledger or centralised ledger or any other data structure that is configured to record the financial transaction is also configured to enable a player to use or transfer currency, fiat currency or cryptocurrency in order to purchase goods or services that are external to the game.

altering each player's balance is subject to transaction or processing fees that may be deducted from either the payer or the recipient's wallet, or split between both players.

Game Score the player's game score equals the amount of game tokens held by the player (or wallet balance).

the player's game score is a direct multiple or divisor of the amount held in the player's digital wallet.

the player's game score is indirectly related to their digital wallet balance through a predefined algorithm.

each player's game score is updated at substantially the same time as a financial transaction that impacts the player's digital wallet.

the system or method is configured to track each player's game score in real-time.

the system or method is configured to link a value of each player's game score to their wallet balance in real time.

the system or method is configured to link a value of each player's game score to their wallet balance in real time, based on a pre-programmed algorithm.

the system or method is configured to update the player's game score, or wallet balance based on the in-game activity of the players participating in the online game.

the system or method is configured to update the player's game score, or wallet balance based on the in-game activity in real-time or near real-time.

the system or method is configured to update the player's game score, or wallet balance at substantially the same time as the in-game action that triggered the financial transaction.

the players' respective wallet balances are displayed directly on their gaming interface, adjacent to their in-game avatar or character.

the system or method is configured to dynamically adjust in-game rewards based on real-time performance metrics, player score, or wallet balance.

each player's game score is linked to the performance of predefined actions within the game, such as completing missions, earning rewards, or defeating opponents Real-Time Token Balance Adjustments adjustment to the token balances of players occur in real time during gameplay and involves direct player to player transfers between players' digital wallets without intermediate processing by a centralized server.

the adjustment to the token balances occurs at substantially the same time, or immediately after, each game action that triggers the transaction.

the real-time adjustment process guarantees latency under 200 milliseconds, such as by using edge servers geographically close to the players.

the adjustment occurs and is displayed on each affected player's computing device at substantially the same time, or immediately after, each game action that triggers the adjustment.

adjustment of the token balances is implemented through a smart contract deployed on an Ethereum-based blockchain, where the smart contract ensures immutability and transparency of in-game currency transfers.

the updated token balance on each player's computing device is displayed with no indication of direct transfers between players.

the adjustments are determined by predefined game rules.

the digital wallet is not designed to facilitate user to user currency or cryptocurrency transactions.

In-Game Tokens
   game tokens are held on a player account which has a unique ID.
   game tokens are held on a player account which has an address that represents the player account.
   game tokens are held in a player account digital wallet which has a unique address representing the player account within the related custody system.
   digital wallet address is one or a combination of: a number or a text string or any other data string.
   system or method is configured to enable a player to purchase game tokens via their player account.
   a minimum wallet balance is required for a player to participate in certain game events.
   value of the game token in a game is linked to the value of a fiat currency.
   game tokens are assigned a fixed value linked to a fiat currency.
   game tokens are credited to a player's wallet balance, subject to exchange rates and/or transaction fees.
   exchange rates and transaction fees are automatically determined by a game operator.
   game tokens can be purchased using credit card, debit card, PayPal, or blockchain cryptocurrencies.
   the financial transaction involves cryptocurrency selected from the group consisting of Ethereum, Bitcoin, and stablecoins such as USD Coin or Tether.
   a game token is a Ethereum, Tether USD, USD Coin, other ERC-20 token, or any other cryptocurrency.
   a game token is a non-blockchain token registered and managed on any computer system.
   digital wallet includes a feature for automatic currency conversion based on real-time exchange rates.
   digital wallet includes a feature for player to player lending and/or borrowing within the game, allowing players to lend game tokens or currency to each other.
   players can earn game tokens by completing tasks or watching advertisements.
   players are rewarded for referrals, earning additional tokens that are credited to their digital wallet.
Game Actions
   game action includes any interaction between players, characters, or game elements.
   game elements include sprites, characters, or objects within the game environment.
   game actions involve offensive, defensive, or collaborative manoeuvres such as attack, strike, assist, or similar interactions.
   game actions involve board-games related actions such as moving a game piece, rolling dice, drawing a card, placing a token or executing a rule-based action that results in a state change.
   game elements can hold a pre-defined game token value.
   game elements value can dynamically change during gameplay based on predefined conditions or game actions.
   each game action generates a unique cryptographic signature.
   each game action corresponds to a game token value or cryptocurrency value.
   system or method is configured to facilitate dynamic adjustments of game token balances or direct transfer of funds or game tokens between players based on the monitored game actions and/or consequential game events.
   adjustment of game token balances or a direct transfer of funds or game tokens between players is initiated after the detection of each game action.
   in-game actions or events are dependent on a user's skill while playing the game.
   adjustment of game token balances or a direct transfer of funds or game tokens between players is initiated substantially at the same time as the game action that initiated the financial transaction.
   adjustment of game token balances or a direct transfer of funds between two players, such as player A and player B, can be based on:
      an in-game manual action of player A directed at player B.
      an in-game sprite asset of player A that collides with an in-game sprite asset of player B.
      an in-game delegate sprite asset of player A that collides with an in-game sprite asset of player B.
      an in-game delegate sprite asset of player A that collides with an in-game delegate sprite asset of player B.
      a bullet/projectile fired by the in-game spaceship of player A hitting the in-game spaceship of Player B.
      a bullet/missile/projectile fired by the in-game tank of player A hitting the in-game tank of player B.
      a bullet/projectile sprite fired by the in-game sprite of player A hitting the in-game sprite of player B.
      an in-game sprite of player A colliding with player B in a game such as a boxing game.
      involving the in-game vehicle sprite of player A colliding with the vehicle sprite of player B in a game such as a car racing game.
      player A launching a "bullet" that travels on a trajectory inside the game space, reaching and colliding with player B icon.
      player A invoking a shield that protects the player form bullet collisions.
      player A invoking a shield that protects the player form bullet collisions.
      player A invoking a shield that protects the player form bullet collisions.
      player A has captured a game piece from player B.
   the increase of funds/tokens in player A wallet is directly related to the decrease of funds/tokens in player B wallet.
   the transfer of funds/tokens is reflected in each player's game score.
   each transfer of funds/tokens is cryptographically secured and recorded onto a blockchain, distributed ledger, or centralised ledger.
   the system supports turn-based interactions where actions from players are executed sequentially, wherein each turn can trigger a transaction or an adjustment of token balance.
   the system or method is further configured to analyse player profiles, gaming statistics or preferences to optimise interactions between different players.
   a token balance is dynamically adjusted based on a game event, such as completing a mission, earning rewards, or defeating an opponent.
Game Manager Subsystem
   the system or method includes a game manager subsystem configured to authenticate or validate a player's identity, when a player sends a request to access the online game.

upon a successful first authentication or validation of a player, the game manager subsystem is configured to create a player account for the authenticated player on the distributed ledger.

authentication of a player comprises authenticating the player's identity through a valid email address or the player's digital wallet.

request to access the online game is only processed based when a consensus is reached amongst players of the online game.

the game system manager prevents tampering with game client applications to ensure transaction integrity.

In-Game Display or Notification the system or method is configured to display each player's in-game factors, such as game score onto the player device, via a graphical player interface.

the player's game score is displayed alongside their corresponding wallet balance.

a value of the sum of all current in-game player's token balances is displayed.

game server is configured to monitor any game event occurring within the online game.

game event includes a player joining, leaving or being eliminated from the game.

game event also includes a player eliminating another player.

system or method is configured to display or generate notifications based on the monitored events.

system or method is configured to transmit notifications to the plurality of player devices.

notifications include token balance or token balance-related score of another player.

Leaderboard method further comprises displaying a leaderboard where player rankings are based on their digital wallet balance or game score.

the system or method is configured to display or generate a leader board.

player ranking module is configured to rank players based on game parameters, such as the player's current token balance.

player ranking module is configured to generate a leader board associated with different parameters within the online game, such as the player's current token balance.

player ranking module is configured to rank players based on game parameters, such as the difference of the player's current token balance and the token balance when the player entered the game.

player ranking module is configured to generate a leader board associated with different parameters within the online game, such as the difference of the player's current token balance and the token balance when the player entered the game.

Game Penalties method further comprising applying penalties or rewards based on player behavior, such as early exit from the game or completion of objectives, which affect the player's digital wallet balance.

penalties include token deductions for disruptive behavior or leaving the game early.

detected behaviour includes leaving the game due to internet connection loss or purposeful disconnection.

detected behaviour includes a modified or hacked player account.

penalty amount is based on a fixed value of game tokens, a percentage of the available token balance or a combination of minimum number of game tokens and percentage of available token balance.

the system or method can disconnect a player from the online game, suspend a player account or bar the player from assessing the online game, in response of a detected behaviour.

penalty tokens are transferred to a game operator account.

the transaction module subsystem is also configured to detect fraud.

the transaction module subsystem includes a fraud detection algorithm that uses machine learning to analyse transaction patterns.

Withdrawal of Tokens game tokens can be withdrawn from a player account and transferred to another designated blockchain or distributed ledger or centralised ledger, or any other ledger or data structure account.

value of the game tokens to be withdrawn are converted to crypto currency or blockchain token.

game tokens can be transferred to a different blockchain or ledger.

Customisation Features the transaction triggers are customizable based on the player's preferences.

the system or method enables players to modify settings for in-game actions.

the system or method enables players to create custom settings for game actions, including complex actions.

the system or method enables players to set financial transaction conditions.

dynamic exchange rates are based on in-game economic conditions.

direct financial transactions between players incorporates a reputation-based system to ensure fair play.

General Features the multi-player online game is a shooting game, tank game, spacecraft game, car racing/bumping game, board game or any sport game involving multiple players such as boxing or martial arts game.

ledger includes a private, public or hybrid blockchain.

ledger is an Ethereum-based blockchain, Cardano-based blockchain or any other blockchain ledger.

a blockchain wallet application resides on the player device or online on the wide area network such as the Internet.

player device is a computer, mobile phone, console, dedicated electronic devices or any other connected device.

blockchain also stores different game parameters, such as player preference, player action, time spent per action.

Latency Improvements the system or method uses predictive algorithms to reduce delay in data transmission, ensuring seamless real-time interaction.

the system or method automatically adjusts data transfer protocols based on real-time network conditions to enhance data transfer efficiency and gameplay smoothness.

the system or method is configured to manage network communication latency using adaptive algorithms based on real-time player feedback and server load.

General Game Features the game is played in a 2 dimensional space.

the game is played in a 3 dimensional space.

the entire game space can be displayed on the player device screen.

part of the game space can be displayed in the player device screen.

part of the game space can be displayed in the player device screen, showing the position of the player and other players, objects and "enemies"

the total number of participating Players may be split into smaller groups of players that are playing the game in a separated space.

each such segmented space may have a different layout and graphical look and feel and may have different, theme for example, simple maze, city, space and spacecraft, cars, tanks and a landscape.

each player is represented by an on-screen icon.

the icon is animated.

the icon indicates the direction of movement of the player within the game space.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented method for enabling interactions between players participating in a multi-player online game, the method comprising the steps of:
    (a) providing or making available the multi-player online game to each player's computing device;
    (b) providing or making available to the players a digital wallet that is configured to store and transact game tokens, currency, fiat currency, or cryptocurrency, where the digital wallet is based on a ledger, blockchain, distributed ledger, centralised ledger, or any other data structure;
    (c) triggering a direct financial transaction between the players participating in the online game based on the occurrence of a specific game action, where the direct financial transaction involves a game token, currency, fiat currency, or cryptocurrency debit to one player and a related or corresponding game token, currency, fiat currency, or cryptocurrency credit to another player that is triggered at substantially the same time as the occurrence of the specific game action; and
    (d) displaying on each player's computing device the balance or value of their digital wallet at substantially the same time as the occurrence of the specific game action.

2. The method of claim 1, wherein the digital wallet is further configured to enable players to use or transfer game token, currency, fiat currency or cryptocurrency in order to purchase goods or services that are external to the online game environment.

3. The method of claim 1, wherein the direct financial transactions occur in real time during gameplay and involves direct player to player transfers between players' digital wallets without intermediate processing by a centralized server.

4. The method of claim 1, wherein the direct transaction is displayed on and updated at each affected player's computing device at substantially the same time as, or immediately after, the triggering game action.

5. The method of claim 1, further comprising altering the player's wallet balance or value on the digital wallet in real time during gameplay depending on the occurrence of predefined game actions.

6. The method of claim 1, further comprising tracking each player's game score in real-time, wherein the score is linked to the player's account balance and updated based on game actions and financial transactions.

7. The method of claim 1, further comprising updating the player's game score, or wallet balance based on the in-game activity of the players participating in the online game.

8. The method of claim 1, further comprising updating the player's game score, or wallet balance at substantially the same time as the specific game action that triggered the financial transaction.

9. The method of claim 1, wherein the method includes the step of dynamically adjusting in-game rewards based on real-time performance metrics, game score, or wallet balance.

10. The method of claim 1, wherein the digital wallet which has a unique address representing the player account within the related custody system.

11. The method of claim 1, wherein the digital wallet address is one or a combination of: a number or a text string or any other data string.

12. The method of claim 1, wherein the value of a game token in a game is linked to the value of a fiat currency.

13. The method of claim 1, wherein game tokens are assigned a fixed value linked to a fiat currency.

14. The method of claim 1, wherein game tokens are credited to a player's account balance, subject to exchange rates and/or transaction fees, and wherein exchange rates and transaction fees are automatically determined by a game operator.

15. The method of claim 1, wherein game tokens can be purchased using credit card, debit card, PayPal, or blockchain cryptocurrencies.

16. The method of claim 1, wherein the financial transaction involves cryptocurrencies selected from the group consisting of Ethereum, Bitcoin, or stablecoins.

17. The method of claim 1, wherein the digital wallet includes a feature for automatic currency conversion based on real-time exchange rates.

18. The method of claim 1, wherein the digital wallet includes a feature for player to player lending and/or borrowing within the game, allowing players to lend game tokens or currency to each other.

19. The method of claim 1, wherein the game action triggering the financial transaction is a player attacking or hitting another player, or other predefined actions resulting in a token transfer.

20. The method of claim 1, wherein each game action generates a unique cryptographic signature that triggers the corresponding financial transaction.

21. The method of claim 1, wherein the method facilitates direct transfer of funds or game tokens between players based on the monitored game actions and/or consequential game events.

22. The method of claim 1, wherein in-game assets, such as weapons, can be transferred alongside the currency in the same transaction.

23. The method of claim 1, wherein all financial transactions are logged on a blockchain, distributed ledger or centralised ledger for auditing or fraud detection purposes.

24. The method of claim 1, wherein a game operator charges different transaction fees depending on the specific game action or the player's in-game performance or the volume of transactions.

25. The method of claim 24, wherein in-game advertising is used to reduce or eliminate the transaction fees for players.

26. The method of claim 1, further comprising: processing a request to access the online game based on a consensus to be reached amongst current players; authenticating or validating a player's identity that has requested to access the online game; and creating the player's account for the authenticated player on a blockchain or distributed ledger or centralised ledger or any other ledger or data structure.

27. The method of claim 1, further comprising applying penalties or rewards based on player behavior, such as early exit from the game or completion of objectives, which affect the player's digital wallet balance.

28. The method of claim 27, wherein the penalties include token deductions for disruptive behavior, disconnection, or early exit from the game.

29. The method of claim 1, wherein the direct financial transactions between players incorporates a reputation-based system to ensure fair play.

30. A computer implemented system for enabling interactions between players participating in a multi-player online game, the system comprising:
(a) a game server configured to provide or make available the multi-player online game to each player's computing device;
(b) a digital wallet that is configured to store and transact game tokens, currency, or fiat currency, or cryptocurrency, where the digital wallet is based on a ledger, blockchain, distributed ledger, centralised ledger, or any other data structure; and
(c) a transaction module subsystem configured to trigger a direct financial transaction between the players participating in the online game based on the occurrence of a specific game action, where the direct financial transaction involves a game token, currency, or fiat currency, or cryptocurrency debit to one player and a related or corresponding game token, currency, or fiat currency, or cryptocurrency credit to another player that is triggered at substantially the same time as the specific game action and where the transaction module subsystem is also configured to cause the game server to display on each player's computing device the balance or value of the digital wallet at substantially the same time as the occurrence of the specific game action.

* * * * *